United States Patent
Briod et al.

(10) Patent No.: US 11,661,188 B2
(45) Date of Patent: May 30, 2023

(54) UNMANNED AERIAL VEHICLE AND PROTECTIVE OUTER CAGE THEREFOR

(71) Applicant: Flyability SA, Lausanne (CH)

(72) Inventors: Adrien Briod, Lausanne (CH); Ludovic Daler, Lausanne (CH); Arnaud Garnier, Lausanne (CH); Joel Cugnioni, Ollon (CH); Pierre-Etienne Bourban, Nyon (CH); Veronique Michaud, St Saphorin (CH)

(73) Assignee: FLYABILITY SA, Lausanne (CH)

( * ) Notice: Subject to any disclaimer, the term of this patent is extended or adjusted under 35 U.S.C. 154(b) by 1188 days.

(21) Appl. No.: 16/097,745

(22) PCT Filed: May 1, 2017

(86) PCT No.: PCT/EP2017/060308
§ 371 (c)(1),
(2) Date: Oct. 30, 2018

(87) PCT Pub. No.: WO2017/186967
PCT Pub. Date: Nov. 2, 2017

(65) Prior Publication Data
US 2020/0189712 A1 Jun. 18, 2020

(30) Foreign Application Priority Data
Apr. 30, 2016 (CH) .................. 16167833.9

(51) Int. Cl.
*B64C 39/02* (2023.01)
*B64C 27/00* (2006.01)
*B64U 10/13* (2023.01)

(52) U.S. Cl.
CPC .......... *B64C 39/024* (2013.01); *B64C 27/006* (2013.01); *B64U 10/13* (2023.01)

(58) Field of Classification Search
CPC .......... B64C 1/062; B64C 1/08; B64C 27/006
See application file for complete search history.

(56) References Cited

U.S. PATENT DOCUMENTS 7,273,195 B1 9/2007 Golliher
8,147,289 B1 4/2012 Lee
(Continued)

FOREIGN PATENT DOCUMENTS

CN 202 896 880 U 4/2013
WO 2004113166 A1 12/2004
(Continued)

OTHER PUBLICATIONS

European Patent Office/ISA, International Search Report for PCT Application No. PCT/EP2017/060308, dated Jul. 21, 2017.
(Continued)

*Primary Examiner* — Nicholas McFall
(74) *Attorney, Agent, or Firm* — Socal IP Law Group LLP; Angelo Gaz

(57) ABSTRACT

Unmanned aerial vehicle (UAV) including a flight propulsion system and a support system coupled to the flight propulsion system, the support system comprising a protective outer cage configured to surround the flight propulsion system, wherein the outer cage comprises a plurality of cage frame modules that are manufactured as separate components and assembled together to form at least a portion of the outer cage configured to surround the flight propulsion system.

34 Claims, 28 Drawing Sheets

(56) References Cited

U.S. PATENT DOCUMENTS

| | | | |
|---|---|---|---|
| D659,771 S | 5/2012 | Seydoux et al. | |
| 8,528,854 B2 | 9/2013 | Yan et al. | |
| 9,150,069 B2 | 10/2015 | Kalantari et al. | |
| 2007/0184288 A1* | 8/2007 | Garamszegi | B29C 67/24 |
| | | | 428/447 |
| 2009/0075551 A1 | 3/2009 | Chui et al. | |
| 2010/0224723 A1* | 9/2010 | Apkarian | A63H 27/12 |
| | | | 244/65 |
| 2014/0034776 A1 | 2/2014 | Hutson | |
| 2014/0131507 A1* | 5/2014 | Kalantari | B60F 5/02 |
| | | | 244/2 |
| 2016/0001875 A1 | 1/2016 | Daler et al. | |
| 2017/0291697 A1* | 10/2017 | Kornatowski | B64C 27/08 |

FOREIGN PATENT DOCUMENTS

| | | |
|---|---|---|
| WO | 2014198774 A1 | 12/2014 |
| WO | 2015022455 A1 | 2/2015 |
| WO | 2015105554 A1 | 7/2015 |
| WO | 2015135951 A1 | 9/2015 |
| WO | 2017176967 A1 | 11/2017 |

OTHER PUBLICATIONS

European Patent Office/ISA, Written Opinion of the International Search Authority for PCT Application No. PCT/EP2017/060308, dated Jul. 21, 2017.

Mizutani Shoma et al: "Proposal and experimental validation of a design strategy for a UAV with a passive rotating spherical shell", 2015 IEEE/RSJ International Conference on Intelligent Robots and Systems (IROS}, IEEE, Sep. 28, 2015 (Sep. 28, 2015}, pp. 1271-1278, XP032831800, DOI: 10.1109/IROS.2015.7353532 [retrieved on Dec. 11, 2015].

European Patent Office, Extended European Search Report for EP Application No. 21216020.4, dated Apr. 4, 2022.

* cited by examiner

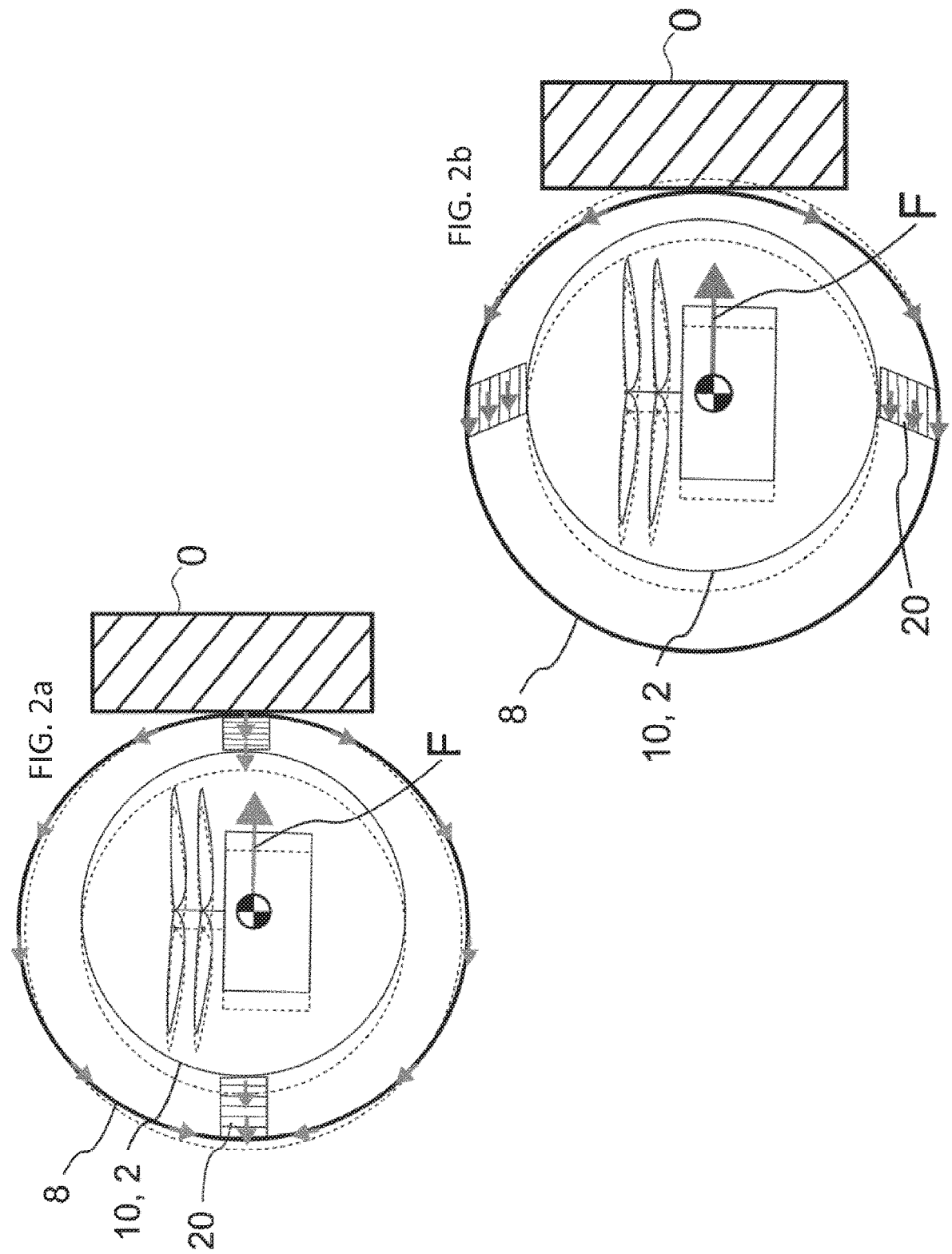

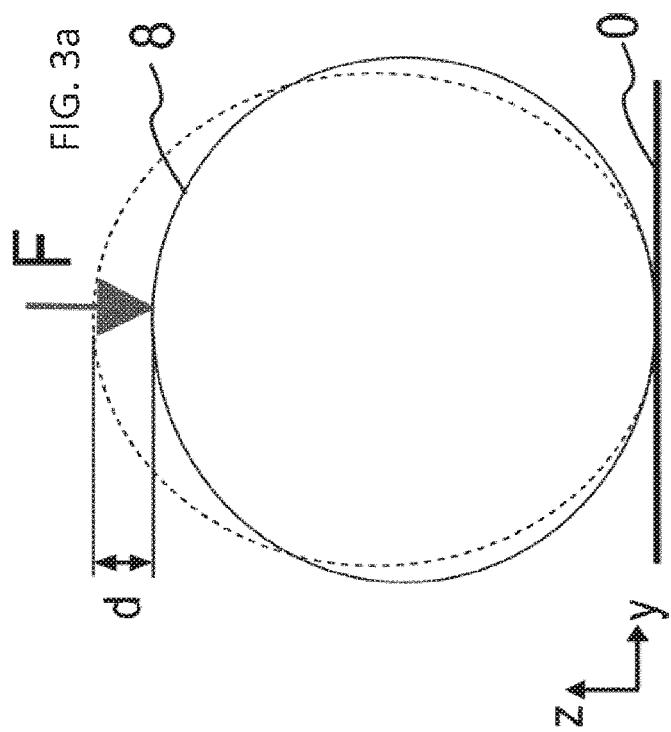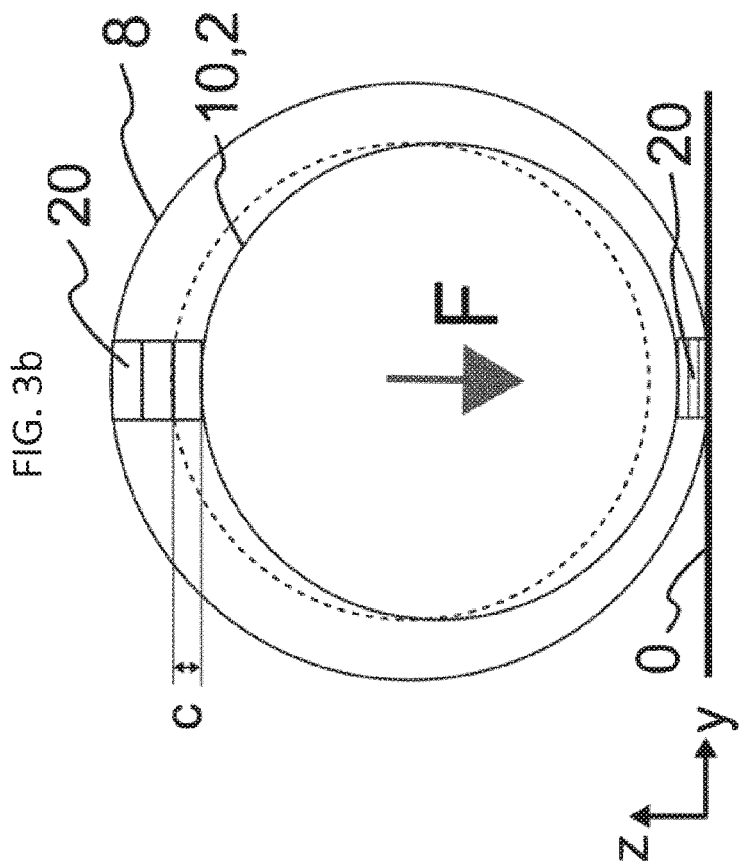

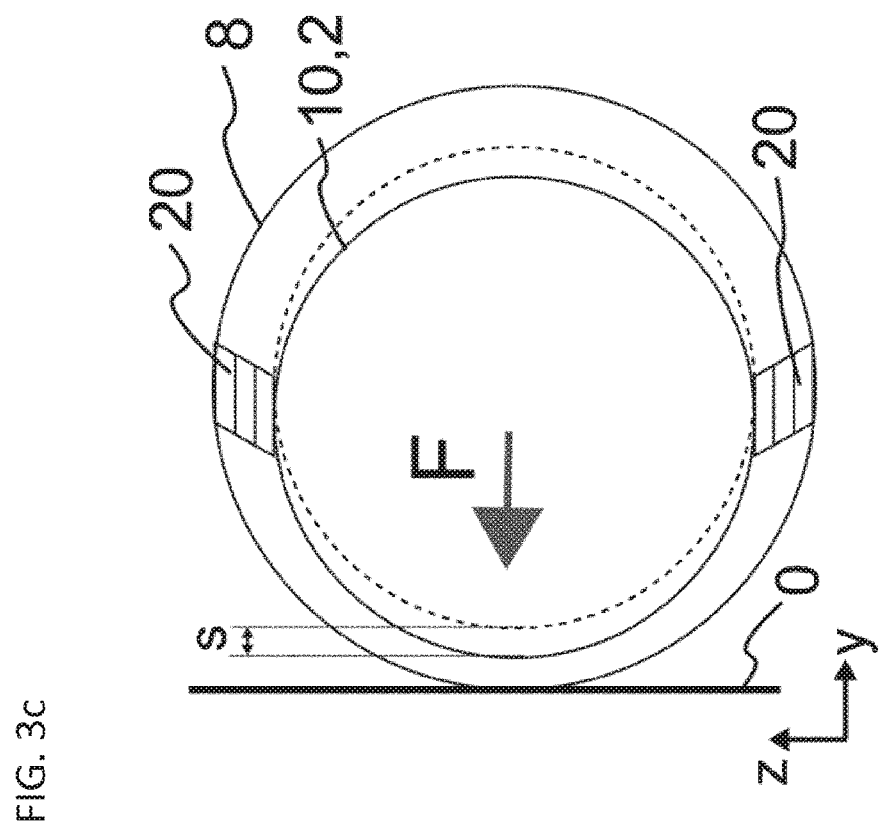

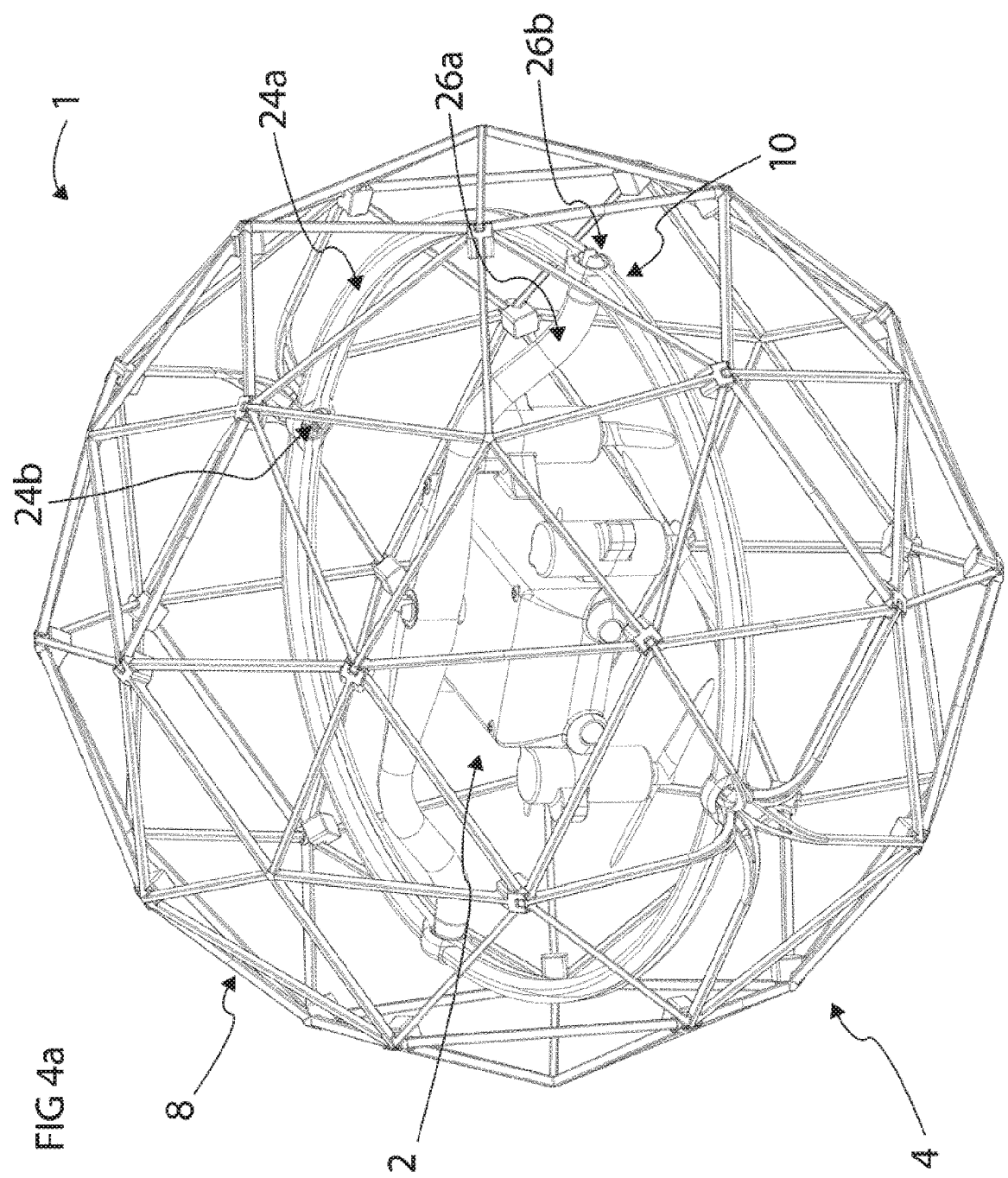

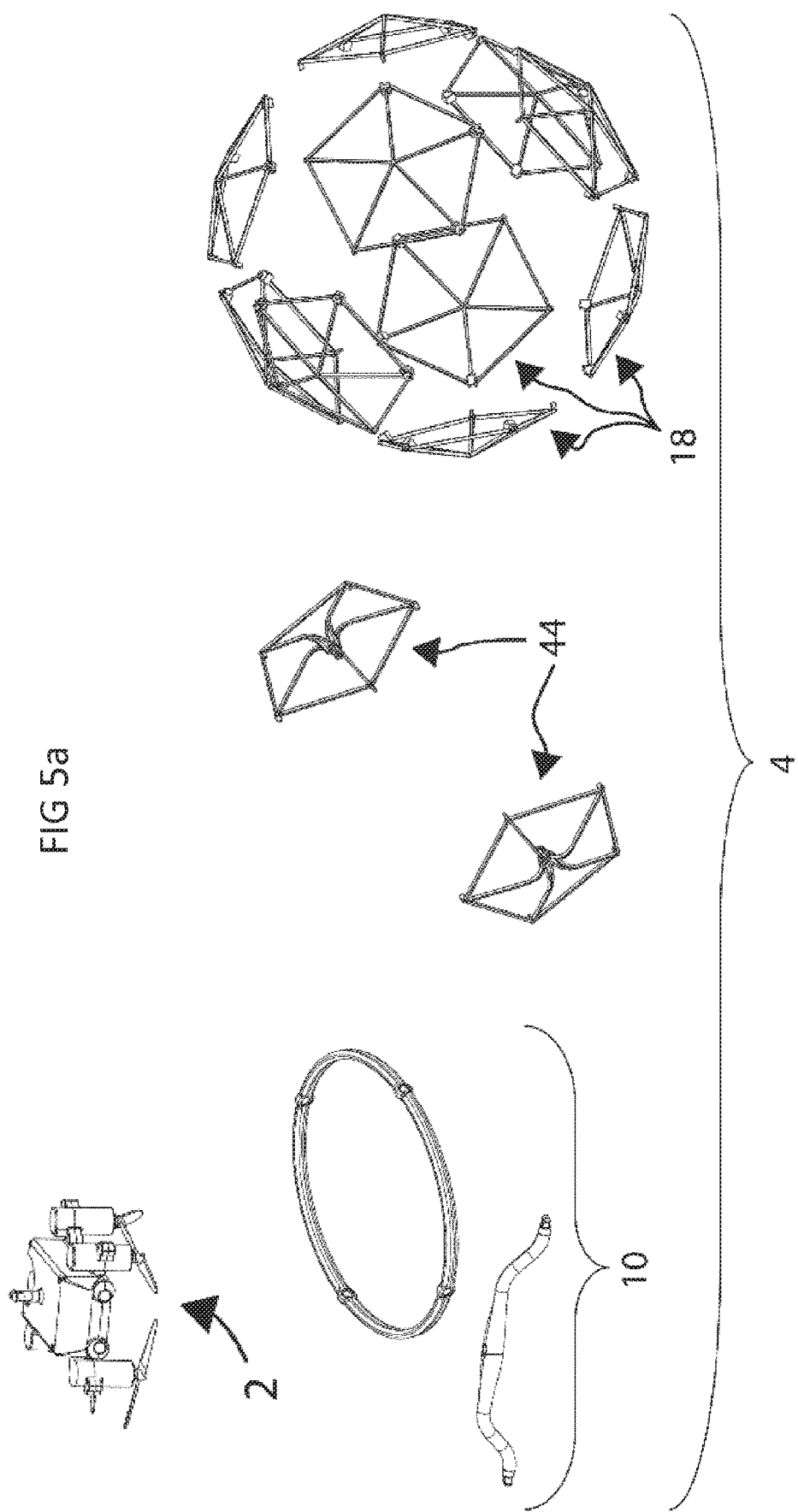

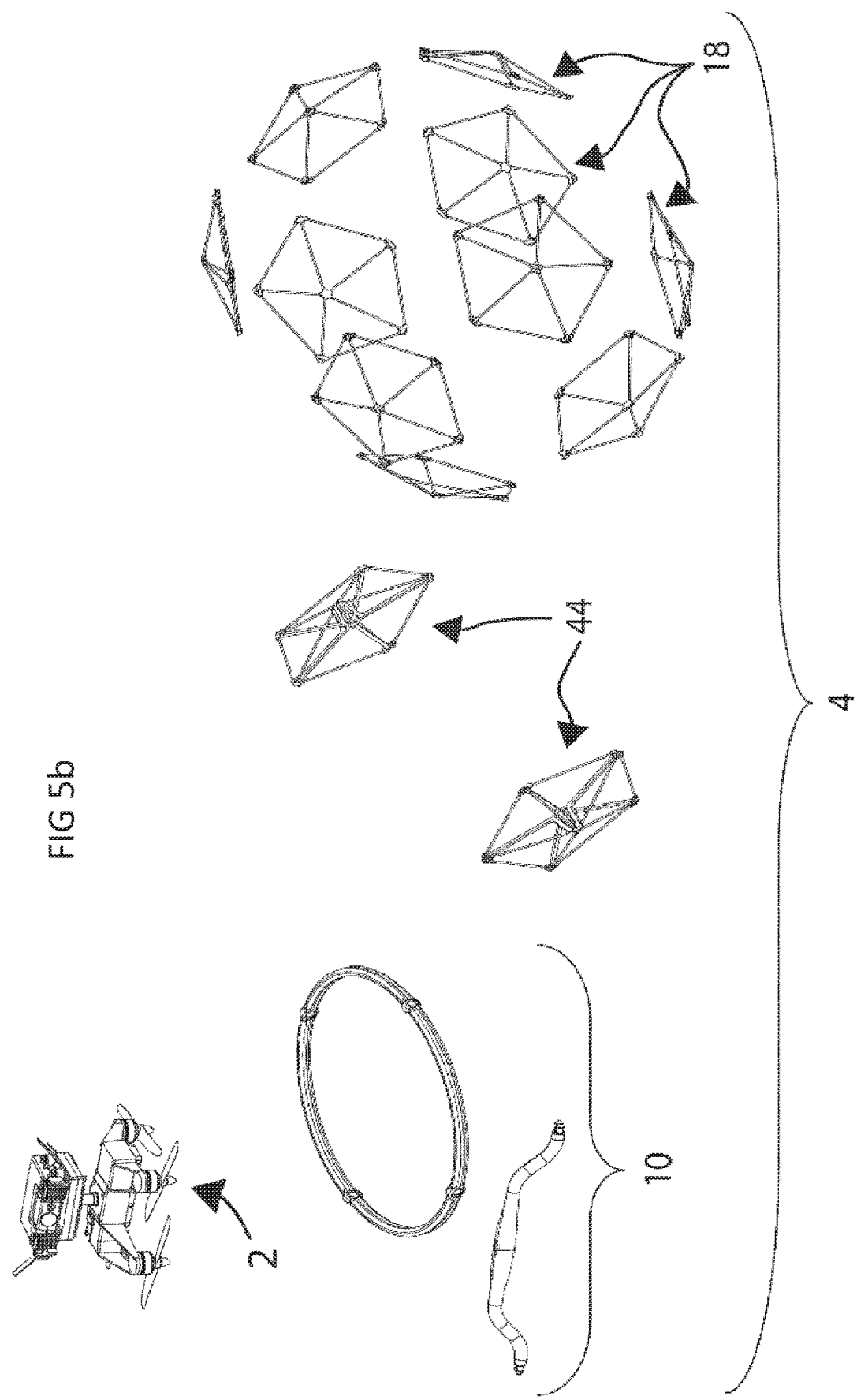

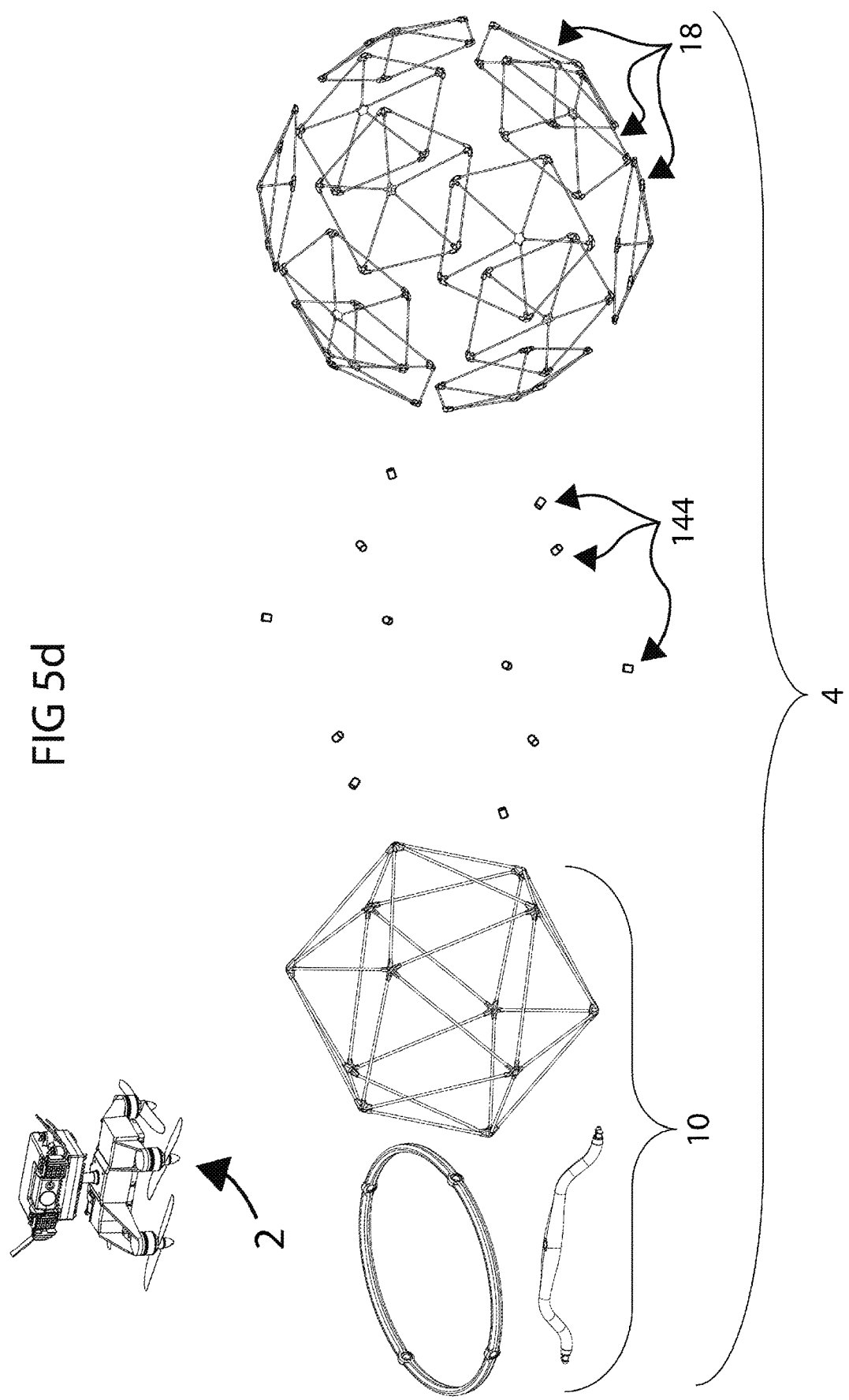

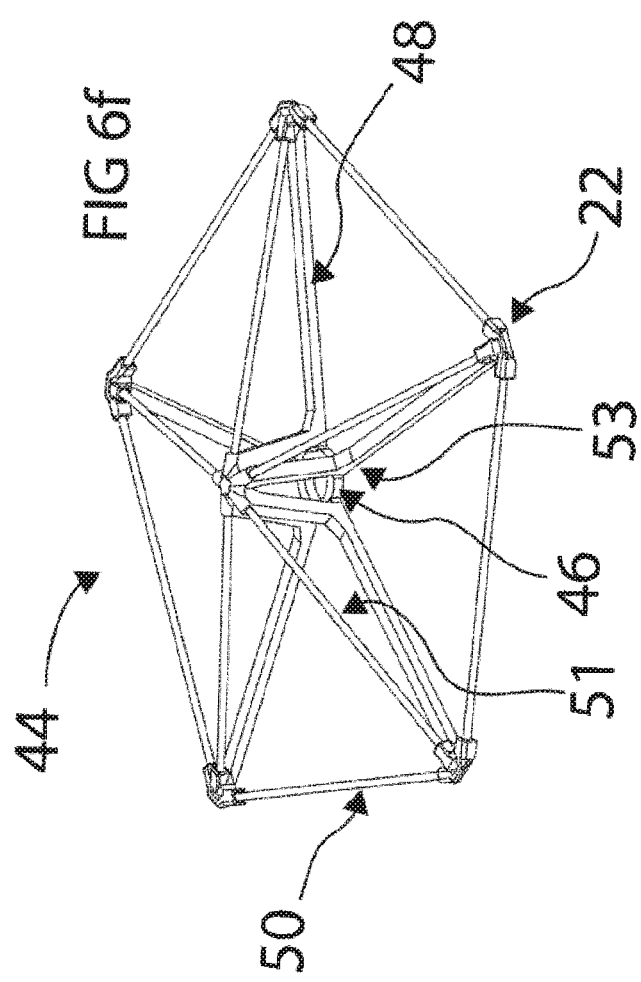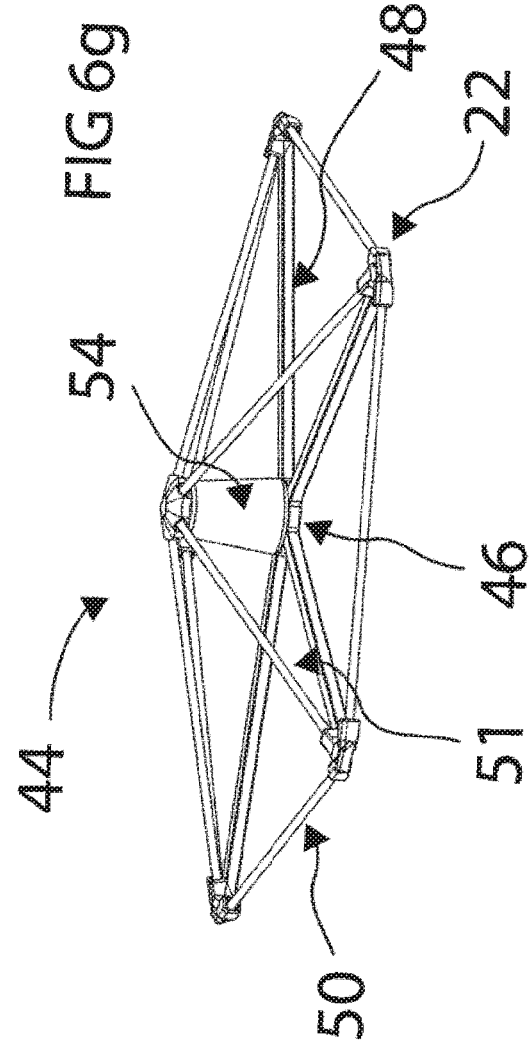

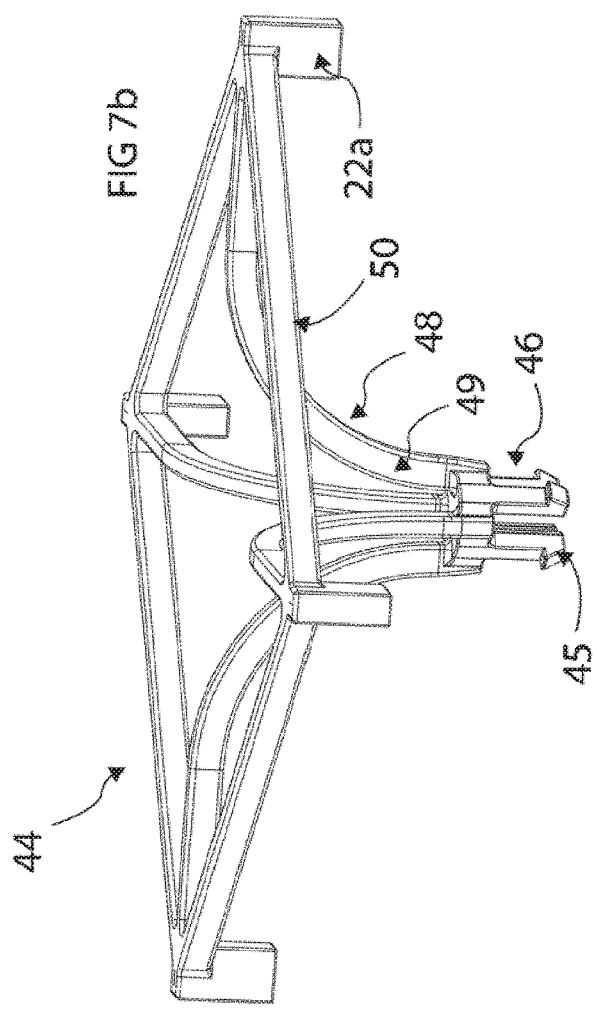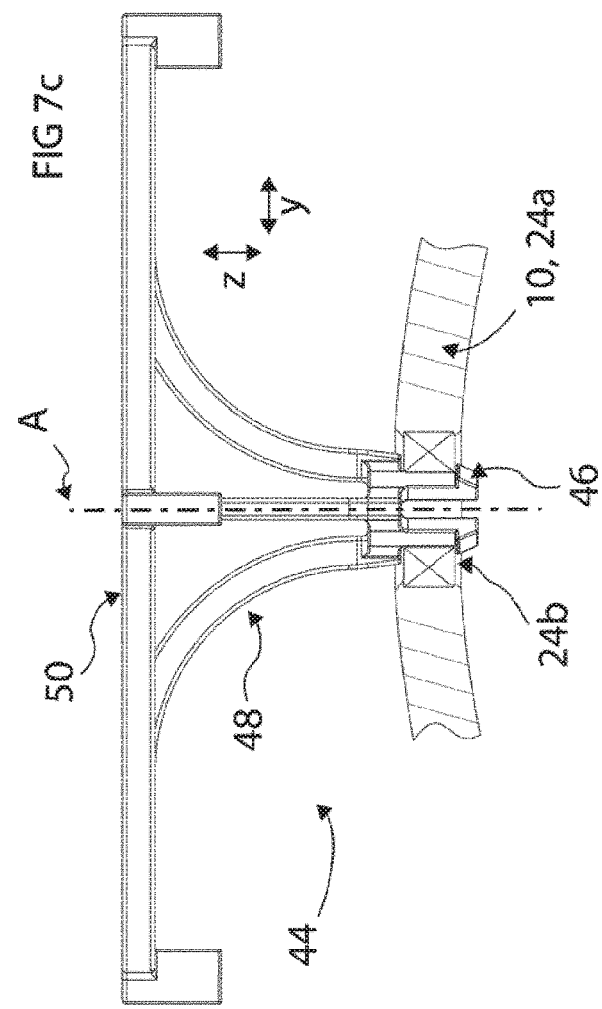

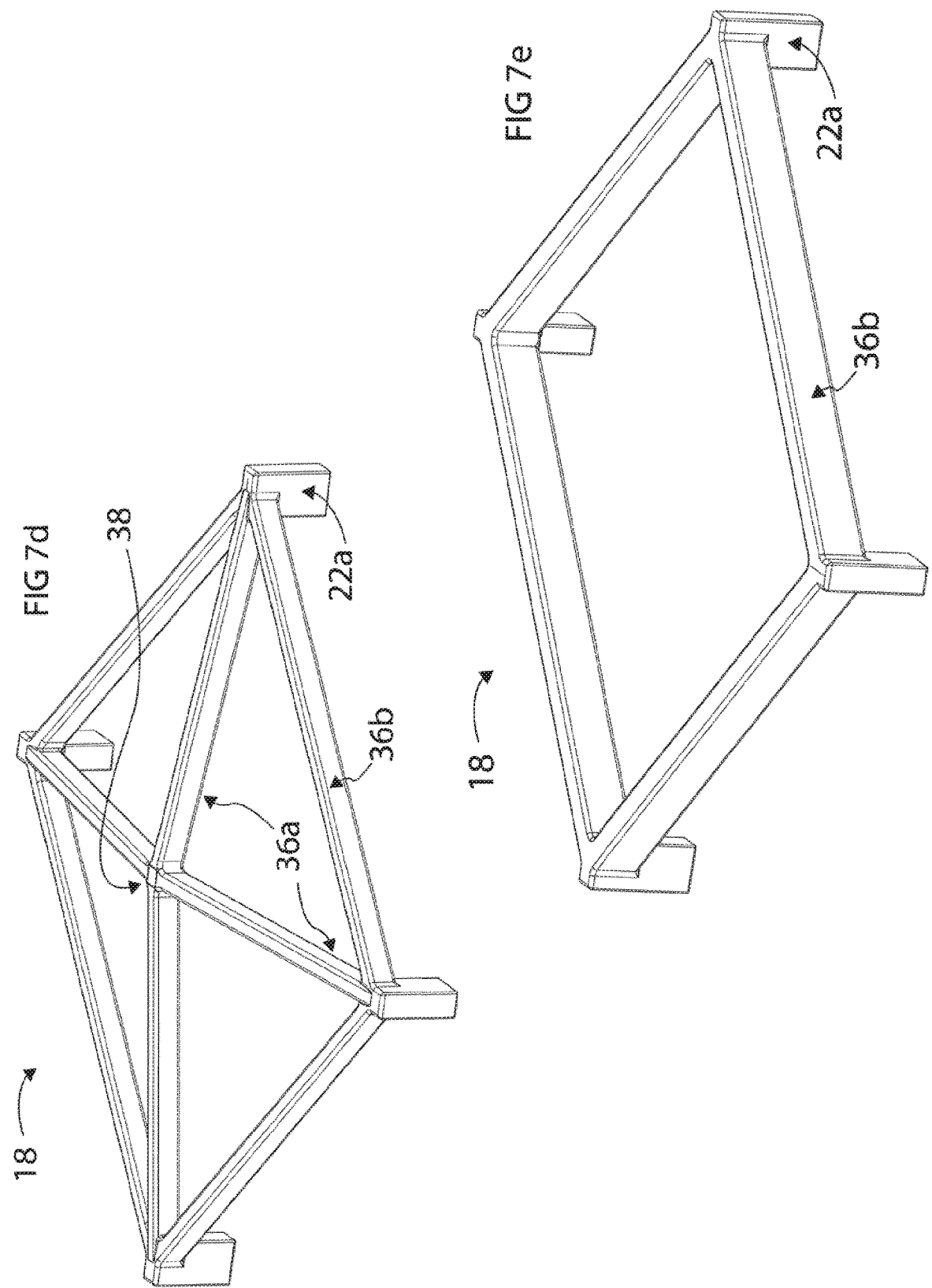

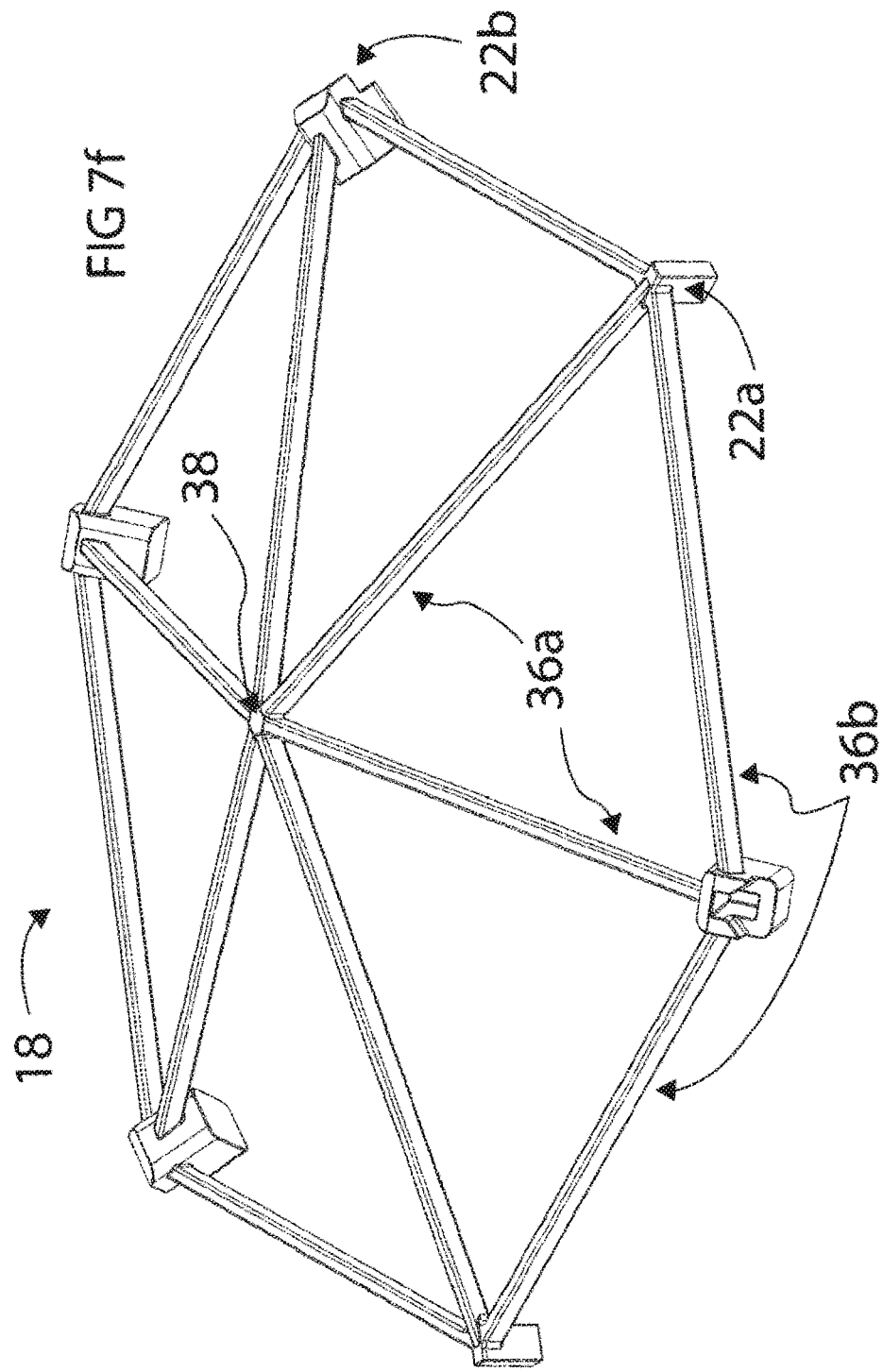

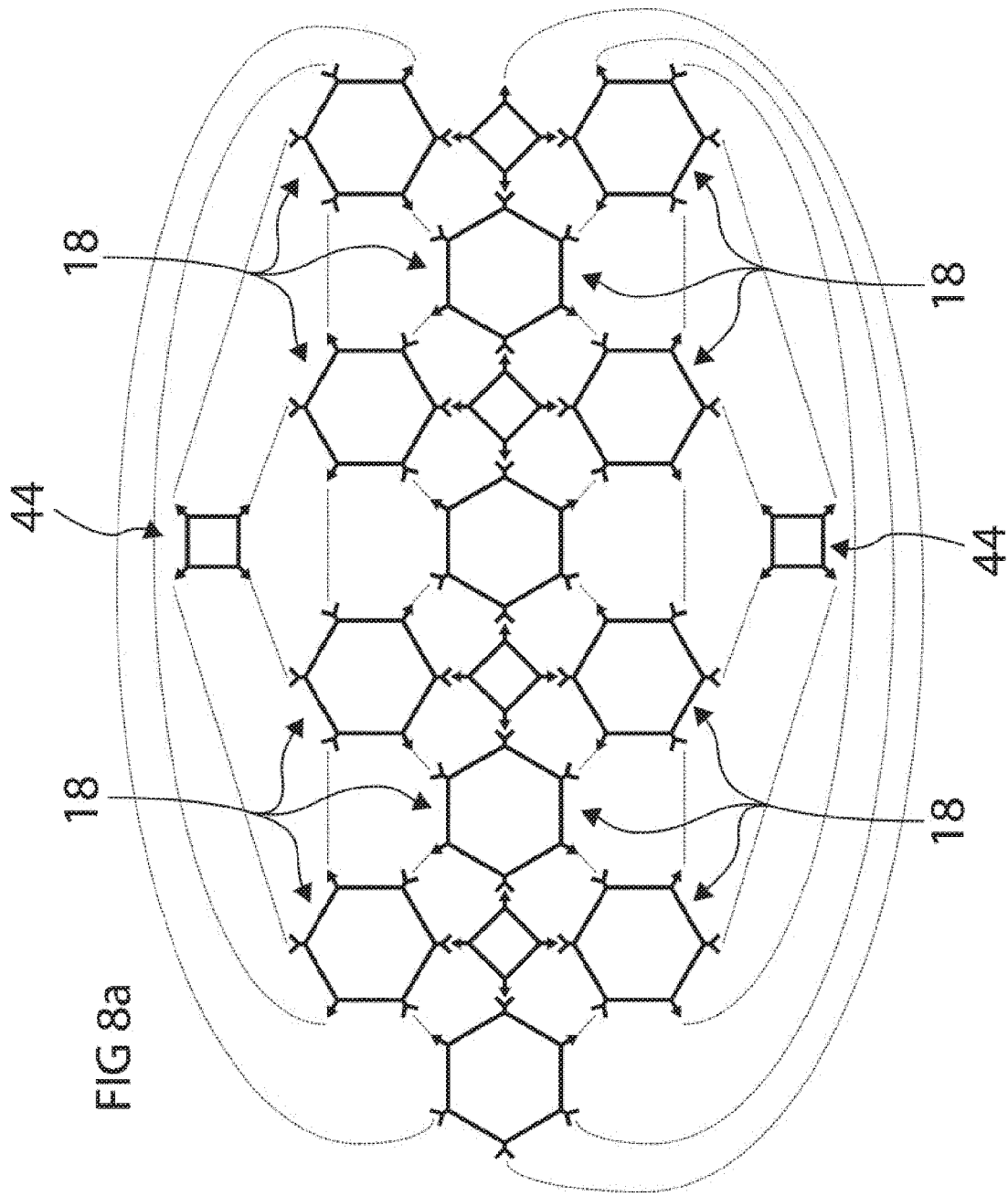

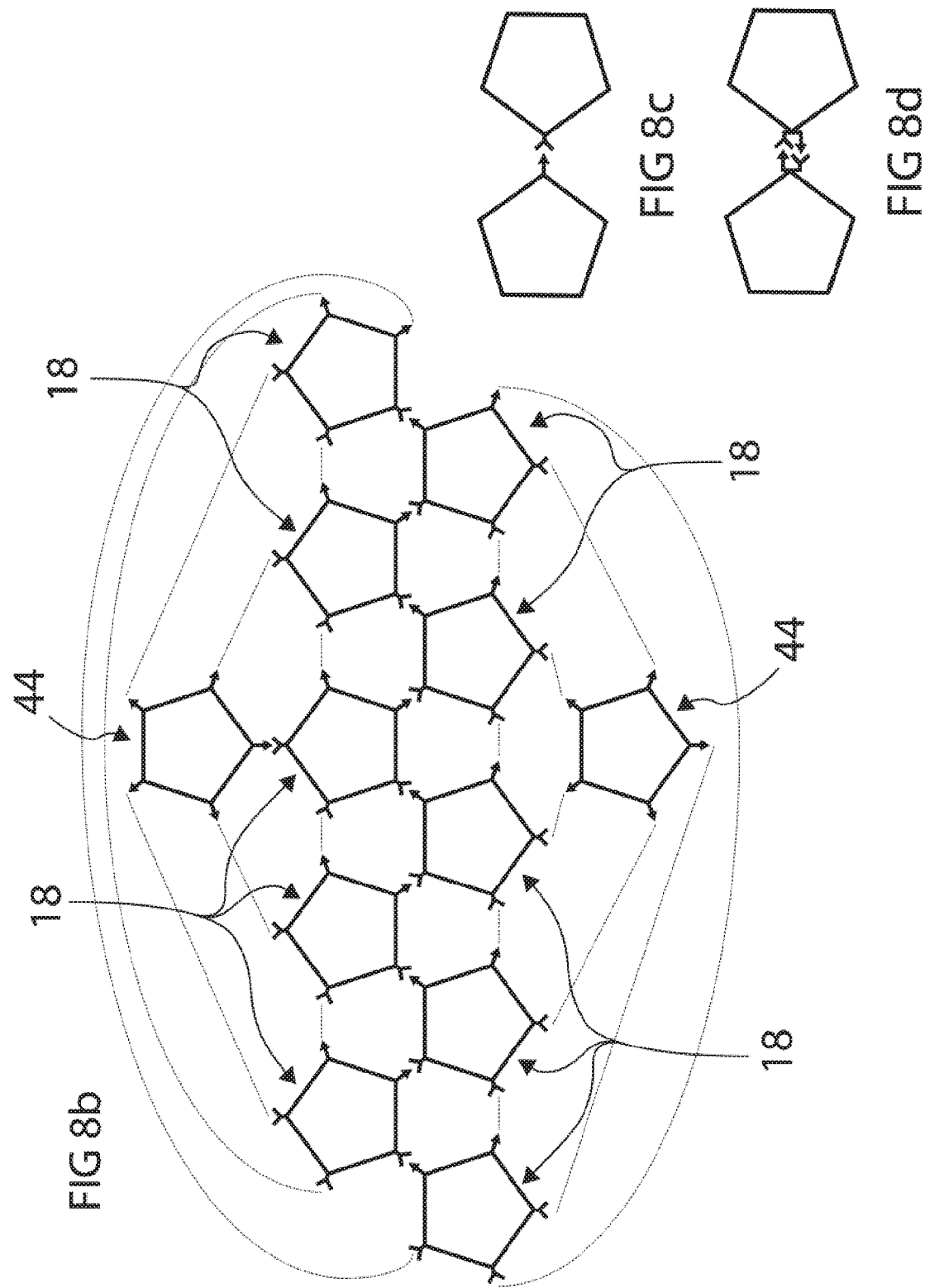

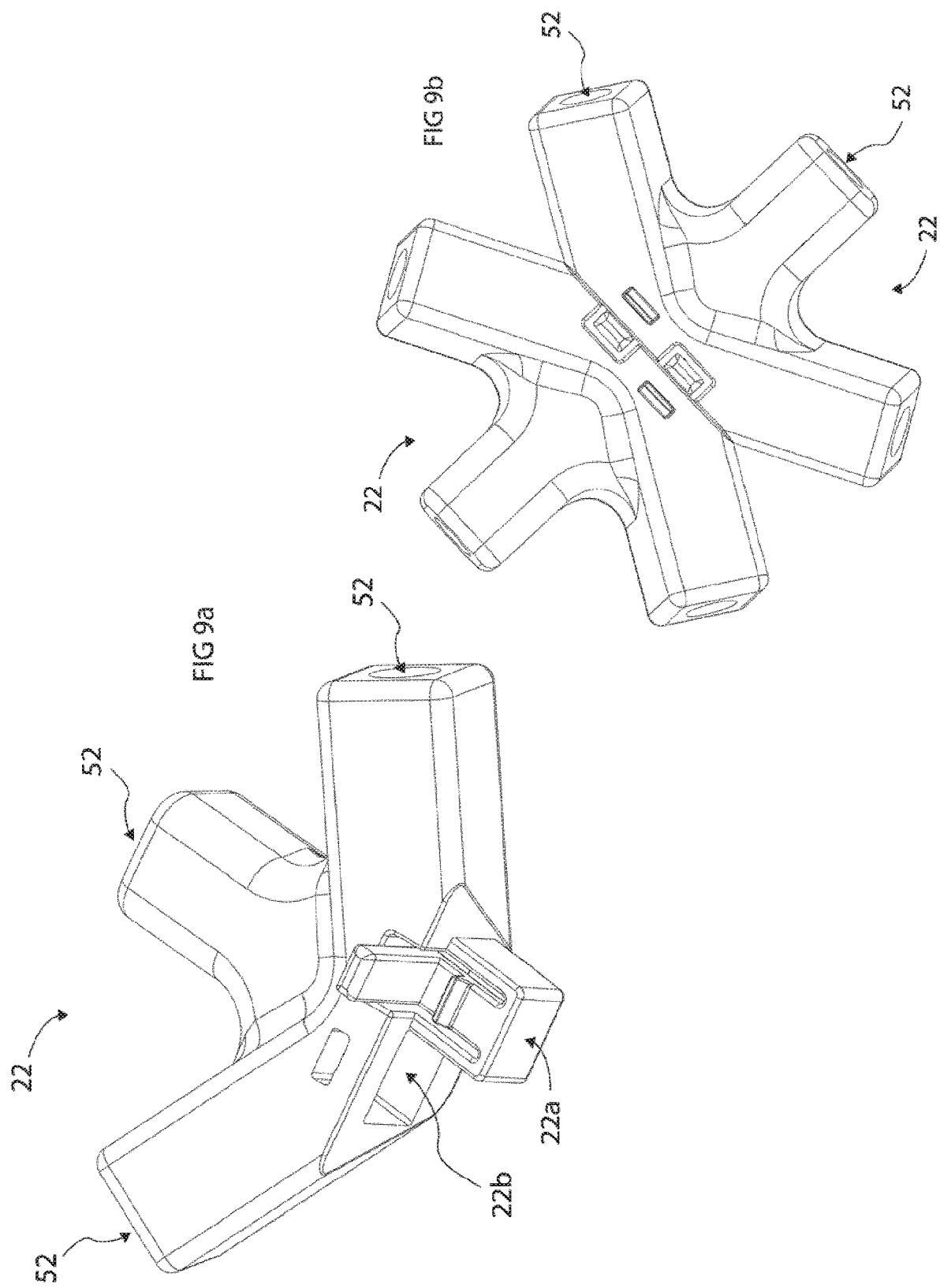

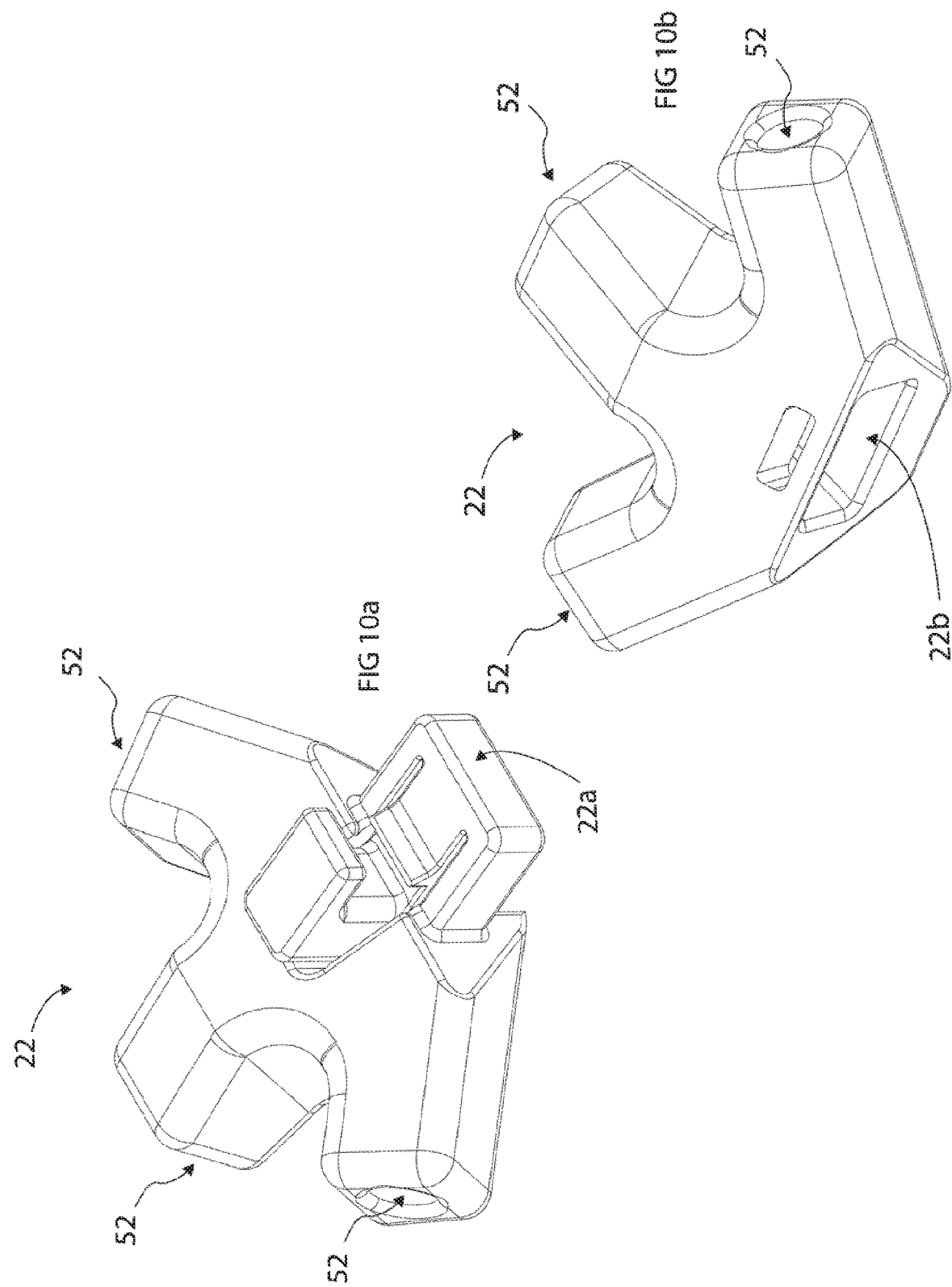

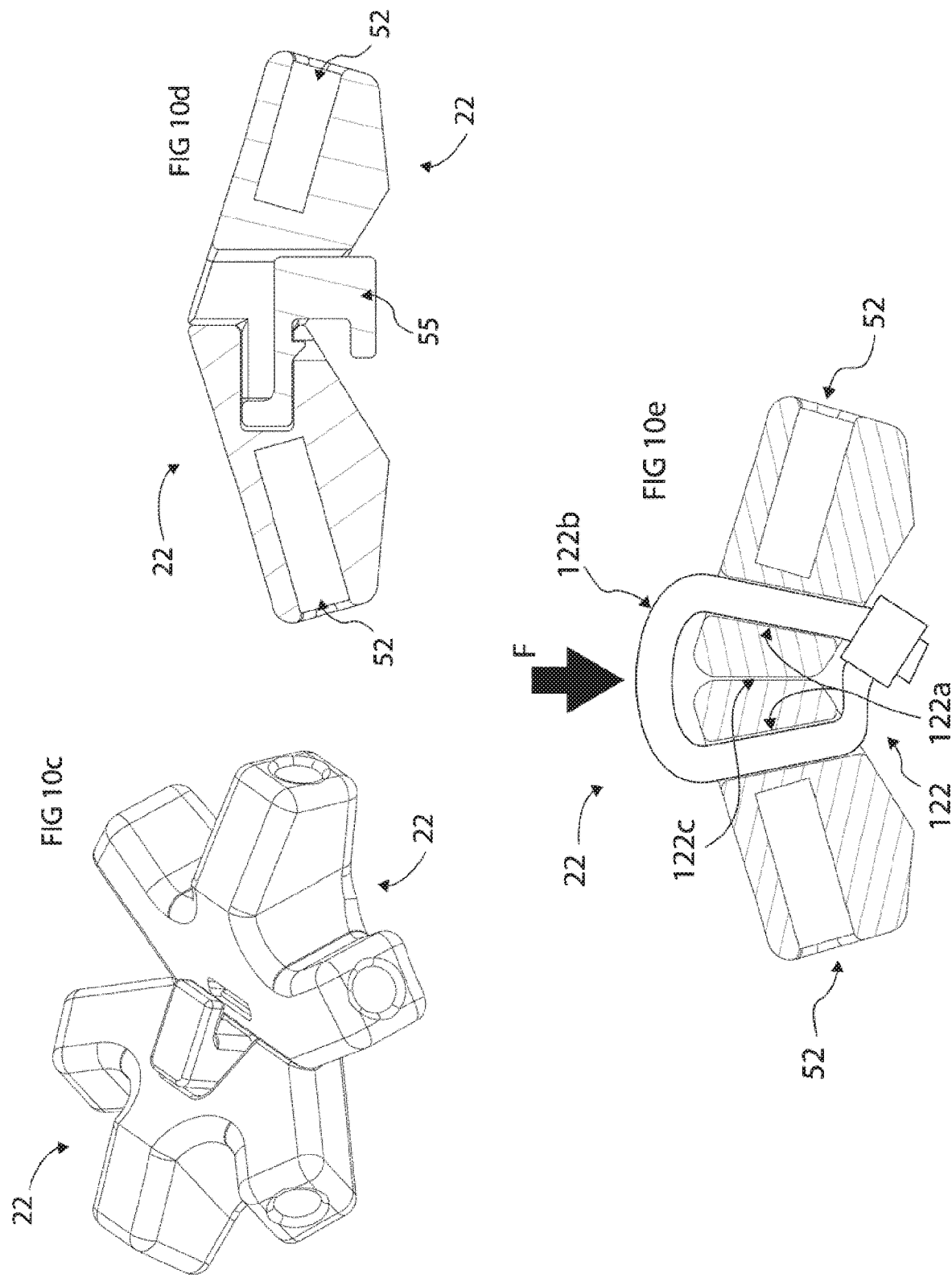

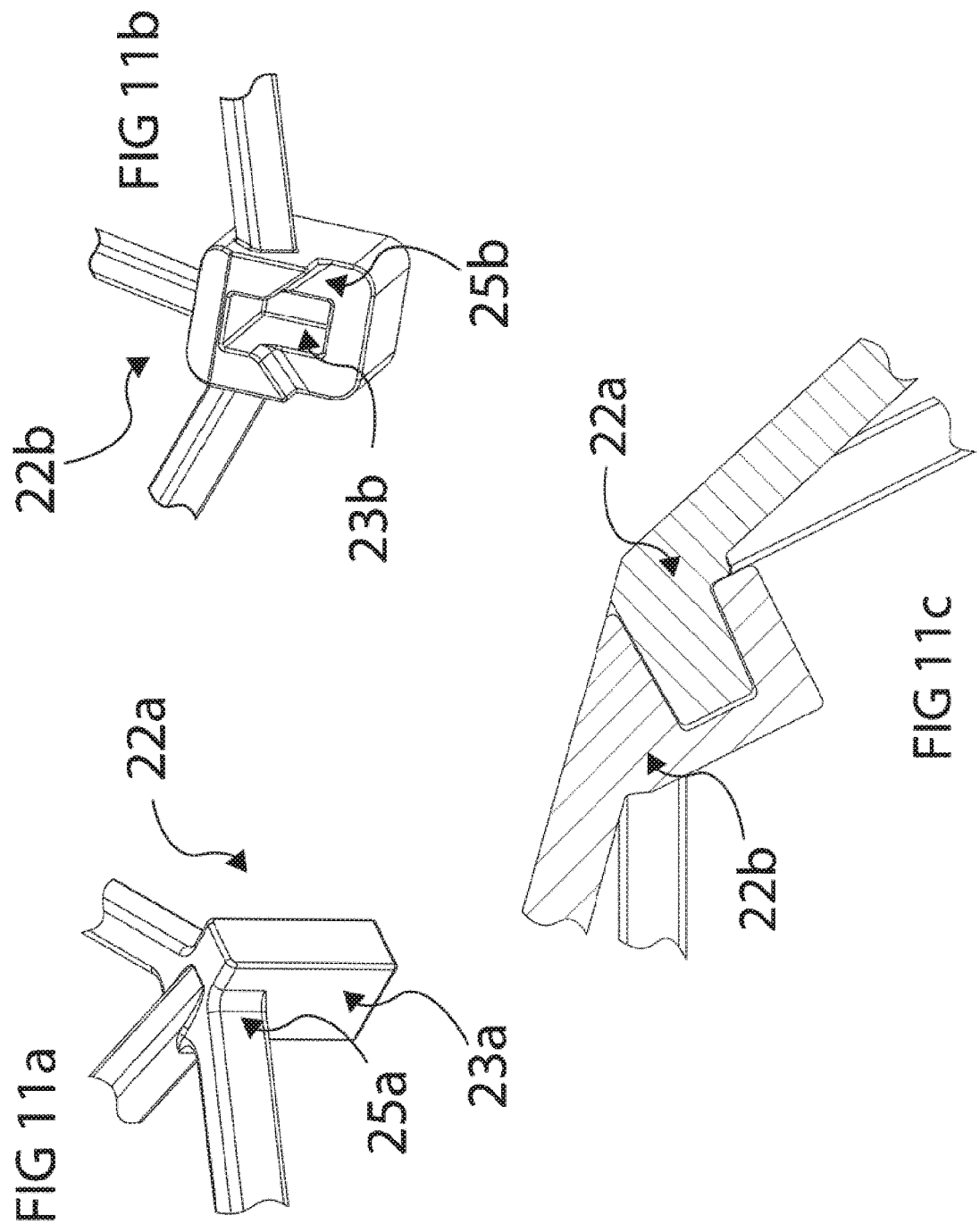

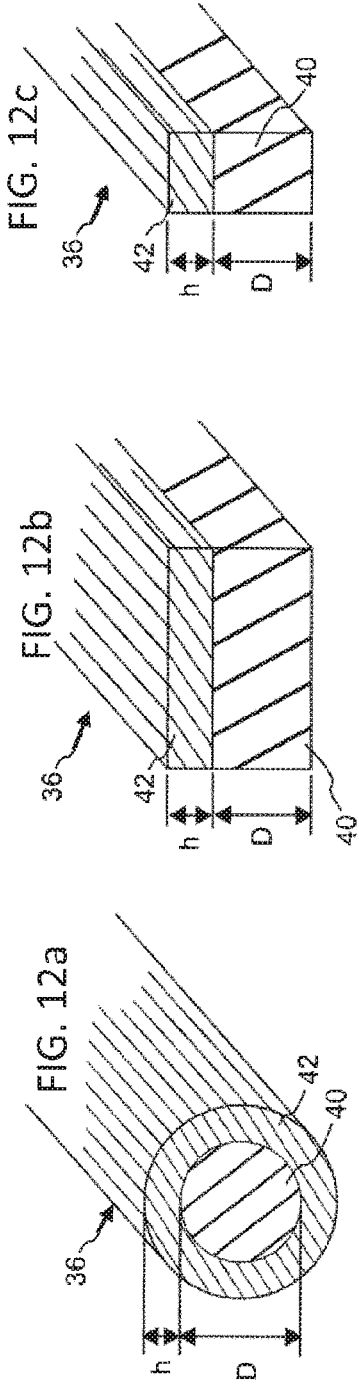
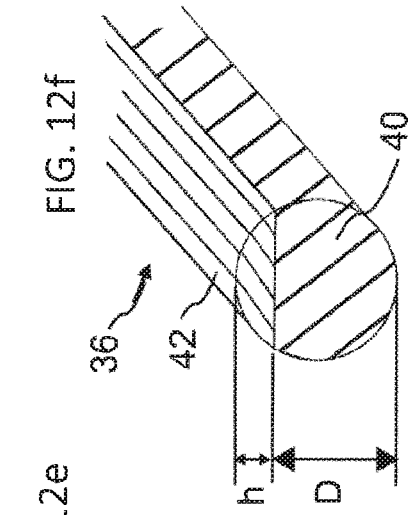
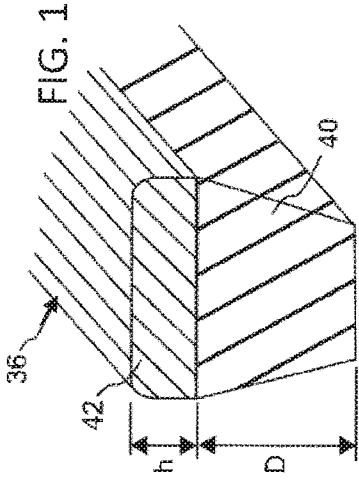
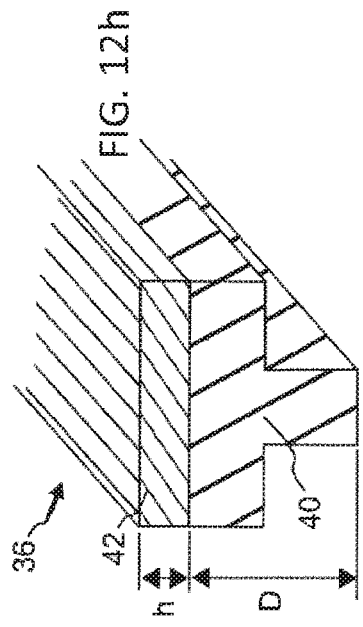
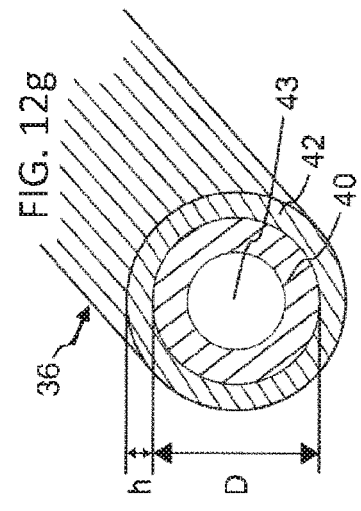

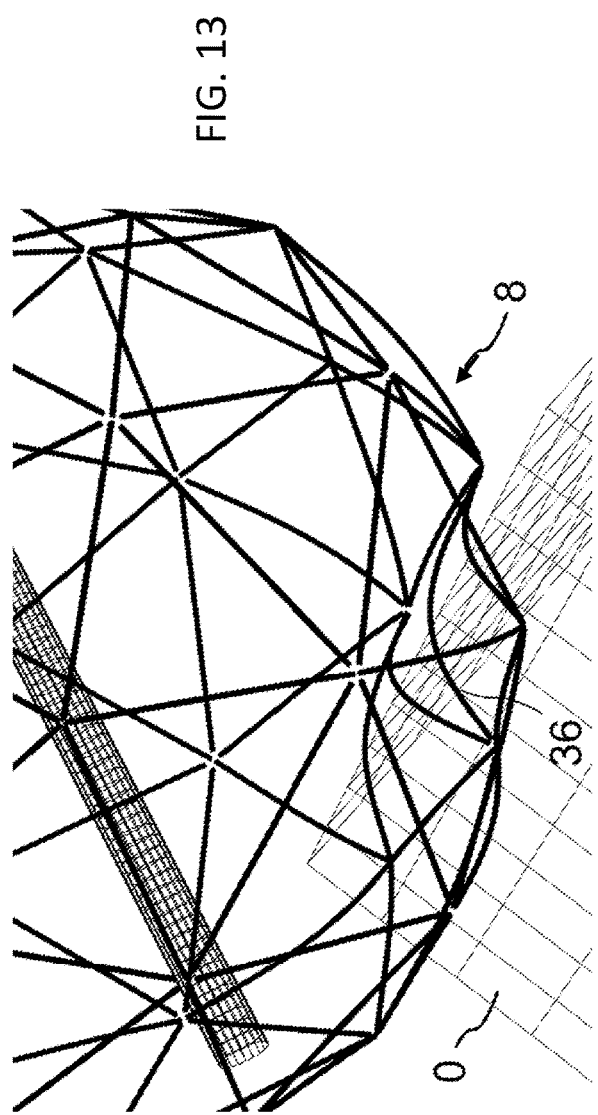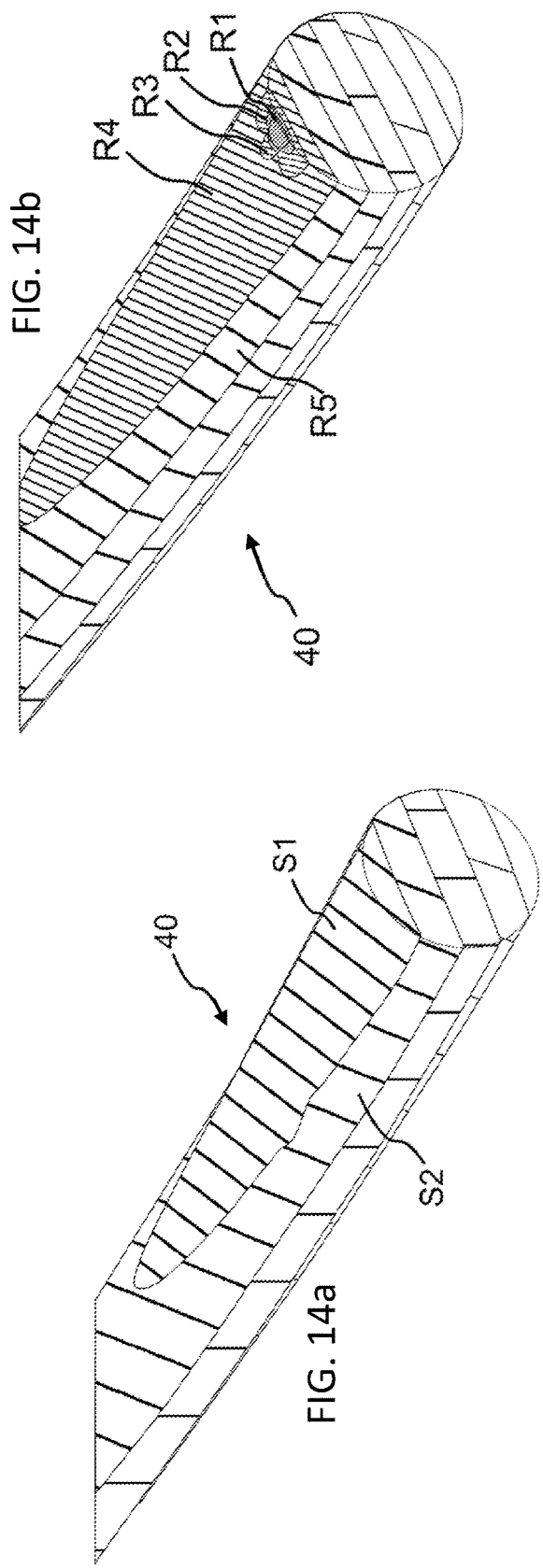

UNMANNED AERIAL VEHICLE AND PROTECTIVE OUTER CAGE THEREFOR

This application claims priority to International PCT Application No. PCT/EP2017/060308, with an international filing date of May 1, 2017, entitled "Unmanned Aerial Vehicle and Protective Outer Cage Therefor," which claims priority to European Patent Application No.: 16167833.9 filed Apr. 30, 2016, the disclosures and figures of which are incorporated by reference as if set forth herein in their entirety.

The present invention relates to an unmanned aerial vehicle (hereinafter also referred to as "UAV") with a protective outer cage.

Protective outer cages structures for aerial vehicles used to protect the inner frame of the aerial vehicle from collisions with the environment and the environment from the inner frame. The inner frame of an aerial vehicle typically includes a propulsion unit with rotating propellers, a control system to control and steer the aerial vehicle, a battery, and other possibly other components such as sensors, cameras, or goods to be delivered, some of these typically being sensitive to strong impacts, or requiring ease of access by an operator. The inner frame may be comprised of an inner support structure, such as a decoupling mechanism, or any other stiff mechanical apparatus which is not meant to come in contact with external obstacles.

Many aerial vehicles are provided with protective outer structures to avoid injury to persons and damage to the environment, as well as to protect the aerial vehicle from damage.

Examples of aerial vehicle with protective cages are illustrated in U.S. D659771, WO 2015/135951, WO2004113166, WO2015022455, U.S. Pat. No. 9,150,069, US20100224723, U.S. Pat. No. 7,273,195, US20090075551, U.S. Pat. Nos. 8,147,289, 8,528,854, WO2015105554, and WO2014198774. Conventional protective cages are usually capable of protecting the inner frame of the aerial vehicle (in particular propellers) from touching objects during relatively low-energy contacts, sometimes only from some directions (e.g. on the sides). Existing designs are mostly efficient for very light-weight aerial vehicles (in the 200 g range, according to the authors' estimates) or aerial vehicles flying slowly (in the 2 m/s range, according to the authors' estimates). Some vehicles use light-weight materials such as foam, balsa wood, composites, metal, expanded polypropylene or polystyrene in order to obtain light-weight protective cages (e.g. US20090075551 or U.S. Pat. No. 7,273,195B1), however achieving both good protection and good flight performance is often not the aim of such designs. U.S. Pat. No. 7,273,195B1 describes the use of "flexible rods" and suggests additional flexible elements as "the cage further includes elastomeric bumpers at the plurality of intersections between flexible rods". U.S. Pat. No. 9,150,069 describes the cage being made of rigid and lightweight materials such as polycarbonate and carbon fiber materials. Existing protective cages meant to protect an aerial vehicle from all sides (see U.S. Pat. No. 9,150,069B2, US20100224723A1, U.S. Pat. No. 7,273,195B1, U.S. Pat. No. 8,528,854B2, WO2014198774) have a mostly uniform general stiffness on all sides. General stiffness is defined as the resistance to deformation when a force is applied by pressing on two opposite sides of an empty protective cage (without inner frame). The inner frame is typically rigid and rigidly connected to the protective cage at one (cf. U.S. Pat. Nos. 7,273,195, 8,528,854), two (cf. U.S. Pat. No. 9,150,069, US20100224723, WO2014198774, WO2004113166, WO2015022455) or four (WO2015105554) cage connection points. In U.S. Pat. No. 7,273,195 softer parts on the interfaces with the external objects are added in order to contribute to withstanding part of the collision energy.

A limitation of many existing protective cages is that they have a very non-uniform protection performance due to the rigid connection points between the protective cage and the inner frame. Typically, the protective cage will be of little help in withstanding collision energy in case of impact at or close to the cage connection point, since the loads are directly transferred to the inner frame at these rigid connection points, which means that the inner frame must be dimensioned so that it can withstand a significant amount of the collision energy (if not all of it). On the other hand, the behavior is likely to be very different if the impact location is further away from the connection points, in which case the protective cage may withstand most of the energy while the inner frame may not have to. Conventional designs are mostly driven by the need to provide protection at low impact speed.

A challenge for protecting an aerial vehicle at high impact speeds lies in the minimization of the weight of the protective cage, minimization of the size (when assembled, and dis-assembled), the complete coverage of the protection on all sides of the aerial vehicle, and the minimization of the aerodynamic drag caused by the protective cage (in particular the elements which are below the propulsion system). Indeed, the performance of aerial vehicles, in particular in terms of flight duration and control reactivity, is particularly affected by the increase in weight of the aerial vehicle and the drag it generates. One way to characterize the performance of a protective cage is typically to look at the collision energy causing irreversible damage on the aerial vehicle, the collision energy being defined as the amount of kinetic energy of the aerial vehicle just before a collision with any type of external object. For the aerial vehicle to survive a collision, the collision energy is typically the strain energy that the protective cage has to withstand without being damaged, and without deforming to the extent that the inner frame is not protected anymore. Note that the collision energy being a kinetic energy, it is influenced by the weight and the velocity of the aerial vehicle.

The protection performance of a protective cage is defined as the amount of energy that a protective cage can withstand for a given cage weight, and a given size of the inner frame to be protected, assuming impacts could be on all sides of the aerial vehicle.

A heavier protective cage on an aerial vehicle results in less weight being available for the battery, which affects directly the flight duration of the aerial vehicle. The weight of the protective cage of an aerial vehicle also affects strongly its moment of inertia because it is generally located at its outer bounds, which affects directly the control reactivity. In applications where aerial vehicles are meant to fly in places close to people and close to objects, good control reactivity is needed in order to react to external disturbances or changes in the environment quickly in a limited volume (aerial vehicles with slower reactions require more space for maneuvering).

The size of a protective cage when assembled also affects the applications for which the aerial vehicle can be used in which space is restricted. The size of a protective cage when disassembled (or when still assembled, if it cannot be disassembled) affects the size of the aerial vehicle or its transportation apparatus (such as a transport case) and thus it affects directly its transportability. Disassembling the cage may also be useful or necessary if a user must gain physical access to the inner frame, for instance to change the battery, access the payload, or repair the propulsion system.

An object of the invention is to provide an unmanned aerial vehicle (UAV) with a protective outer cage that provides a high resistance against collisions in relation to the weight of the cage and that offers good protection to a flight propulsion system mounted within the cage.

It is advantageous to provide a protective outer cage for a UAV that minimizes resistance of air flow through the cage.

It is advantageous to provide a protective outer cage for a UAV that minimizes hindrance to vision by cameras or sensors installed within the cage.

It is advantageous to provide a outer cage for a UAV that allows easy access to the inside of the protective cage, inter alia for replacement or repair of an inner frame or propulsion system of the UAV.

It is advantageous to provide a outer cage for a UAV that is safe for users even if it has been permanently damaged due to a collision.

It is advantageous to provide a protective outer cage for a UAV that is economical to manufacture and to transport.

It is advantageous to provide a protective outer cage for a UAV that is economical to repair.

It is also an object of the invention to provide a UAV that is safe and robust against collision with external objects, yet that has a high autonomy in flight and that can travel at relatively high speeds.

It is advantageous to provide a UAV that is easy to maintain and repair, in particular that can be quickly repaired in case of a rupture of an element, in particular an element of the protective outer cage.

It is advantageous to provide a UAV that has good maneuverability.

For certain applications, it is advantageous to provide a UAV that can be used in confined spaces or in spaces with multiple obstacles, for instance for inspection purposes of buildings, pipelines, bridges, and other civil engineering structures.

In inspection applications, it is advantageous to provide a UAV that has a high degree of collision protection and yet that can fly at relatively high speeds when needed in order to increase operational efficiency in applications such as inspection applications in which the UAV is used.

Objects of the invention have been achieved by providing an unmanned aerial vehicle (UAV) according to the claims herein.

Disclosed herein is an unmanned aerial vehicle (UAV) including a flight propulsion system and a support system coupled to the flight propulsion system, the support system comprising a protective outer cage comprising a plurality of beams connected together configured to surround the flight propulsion system.

According to a first aspect of the invention, said beams comprise a structural resistance core providing a principal mechanical resistance of the beam and a stress distribution layer mounted on at least a side of the structural resistance core the facing an outer side subject to impact with external objects, said stress distribution layer having a Young's modulus less than 50% of the Young's modulus of the structural resistance core.

According to a second aspect of the invention, the outer cage comprises a suspension system configured to couple the flight propulsion system, or an inner support structure of the UAV on which the flight propulsion system is mounted, wherein the relative elasticity of the outer cage and the suspension system satisfies the following relationships:

$$Pf < Cf < 10\ Pf\ \text{and}\ Pf < Sf < 10\ Pf$$

where

Pf is a ratio of compression displacement d of the outer cage for a pre-buckling force F, Cf is a ratio of compression/traction displacement c of the suspension system for said pre-buckling force F applied between said outer cage and said flight propulsion system or inner support structure, and Sf is a ratio of tangential or shear displacement s for said pre-buckling force F applied between said outer cage and said flight propulsion system or inner support structure, the magnitude of the pre-buckling force F being selected in a range of 50% to 90% of a magnitude of a force that may be applied to the outer cage before a buckling of one or more beams of said plurality of beams of the outer cage.

According to a third aspect of the invention, the outer cage comprises a plurality of cage frame modules that are manufactured as separate components and assembled together to form at least a portion of the outer cage configured to surround the flight propulsion system, each cage frame module comprising a plurality of beams at least some of which generally form a first polygon shape beam structure, wherein the outer cage comprises a suspension system configured to elastically couple the flight propulsion system, or an inner support structure of the UAV on which the flight propulsion system is mounted, to the outer cage, the suspension system comprising at least two cage frame suspension modules, each cage frame suspension module comprising a polygon shape beam structure similar to said first polygon shape beam structure of said at least some of the cage frame modules to allow the cage frame suspension modules to be assembled with the cage frame modules to form the outer cage.

According to a fourth aspect of the invention, the outer cage comprises a plurality of cage frame modules that are manufactured as separate components and assembled together to form at least a portion of the outer cage configured to surround the flight propulsion system, each cage frame module comprising a plurality of beams, comprising beams that form a polygon shape beam structure, wherein each cage frame module further comprises radial beams that interconnect corners of the polygon shape beam structure to a central joining part at another end of the radial beams, the polygon shape beam structure and radial beams forming a single integral part.

According to a fifth aspect of the invention, the outer cage comprises a plurality of cage frame modules that are manufactured as separate components and assembled together to form the outer cage configured to surround the flight propulsion system, each cage frame module comprising a plurality of beams, said cage frame modules coupled together by frame module connectors, wherein the frame module connectors are configured to separate under a bending strain of between 70% and 90% of a bending strain of rupture of one or more of said plurality of beams.

The above mentioned aspects of the invention concern different features of the UAV that are not mutually exclusive and can therefore be combined in any manner to form advantageous embodiments of the invention.

In an advantageous embodiment, the stress distribution layer may have a Young's modulus less than 20% of the Young's modulus of the structural resistance core, preferably in a range of 10% to 0.1%, for instance in a range of 2% to 0.1%

In an advantageous embodiment, the stress distribution layer may typically be provided with a thickness h that is in a range of 3% to 30% the thickness or diameter D of the structural resistance core (0.03<h/D<0.3), preferably in a range of 4% to 20% (0.04<h/D<0.2), more preferably in a range of 5% to 15% (0.05<h/D<0.15).

In an advantageous embodiment, the thickness or diameter of the structural resistance core said stress distribution layer is provided all around the structural resistance core, or only partially around the structural resistance core facing an outer side of the outer cage.

In embodiments, the stress distribution layer may comprise a material selected from a group consisting of Thermoplastic elastomer (TPE), Thermoplastic polyolefin (TPO), polyurethane, toughened epoxy, rubber, EPP, PA, PP, silicone polymer, and combinations of these materials.

In an advantageous embodiment, the relative elasticity of the outer cage and the suspension system satisfies the following relationships:

2Pf<Cf<5 Pf and 2Pf<Sf<5 Pf.

In an embodiment, the radial suspension beams of the cage frame suspension module, or a portion of the radial suspension beams, comprise a material that has a greater elasticity (lower Young's modulus) than the material of the beams of the cage frame modules.

In another embodiment, the cage frame suspension module may comprise frame connection beams forming a polygonal frame connection beam structure connected at its corners to radial beams that join together at their other end, and a suspension element made of a more elastic material than the material of the frame connection and radial beams. The suspension element may be mounted on an inner side of the cage frame suspension module and comprise radial suspension beams connected to each corner of the polygonal frame connection beam structure and joining together at a bearing support portion configured to be coupled to the propulsion system or inner support structure.

In an advantageous embodiment, the frame module connectors are pluggable and configured to unplug under a bending strain of between 70% and 90% of a bending strain of rupture of one or more of said plurality of beams.

In an advantageous embodiment, an inner support structure of the support system couples the protective outer cage to the flight propulsion system, the inner support structure comprising a gimbal system.

In an embodiment, the outer cage may comprise a plurality of identical pentagon shaped cage frame modules and the cage frame suspension modules, for instance built of twelve pentagon shaped modules.

In an embodiment, the plurality of cage frame modules may be identical and comprise three female or male connectors and two connectors of the opposing type.

In an embodiment, the outer cage may comprise hexagon shaped and square shaped cage frame modules and cage frame suspension modules, and for instance may be built of twelve hexagons shaped modules and six square shaped modules.

In an embodiment, the outer cage may comprise a plurality of identical hexagon shaped cage frame modules. The hexagon shaped cage frame modules may for instance comprise four female or male connectors and two connectors of the opposing type.

In an embodiment, the plurality of cage frame modules of the outer cage are identical and comprise identical pluggable connectors.

In another embodiment, the cage frame modules comprise male and/or female pluggable connectors which can be un-connected from each other.

In an embodiment, the outer cage comprises two cage frame suspension modules.

In an advantageous embodiment, at least at part of a surface of the beam or stress distribution layer is non-reflective to light on an inner side. This advantageously reduces hindrance to image capture by camera positioned inside the outer cage.

In an advantageous embodiment, the UAV may further comprise a damping mechanism included in the suspension. The damping mechanism may advantageously be characterized by a damping ratio zeta=Ds/(2*sqrt(Cf*Mi)) that may advantageously be greater than 0.3, where Ds is the damping in N/(m/s) of the suspension, Mi is the combined mass of the inner support structure 10 and flight propulsion system 2, and Cf is a ratio of compression/traction displacement c of the suspension system for a pre-buckling force F applied between said outer cage and inner support structure. The damping ratio zeta may in particular be in a range 0.4<zeta<0.6.

Further objects and advantageous features of the invention will be apparent from the claims, from the detailed description, and annexed drawings, in which:

FIGS. 2a and 2b are schematic illustrations of a UAV with a protective outer cage entering into collision with an external object employing technical solutions according to the present invention;

FIG. 3a is a schematic diagram illustrating the general stiffness of a cage, or the relationship between a general compression force and displacement of an outer cage according to an embodiment of the invention;

Figure 5C:
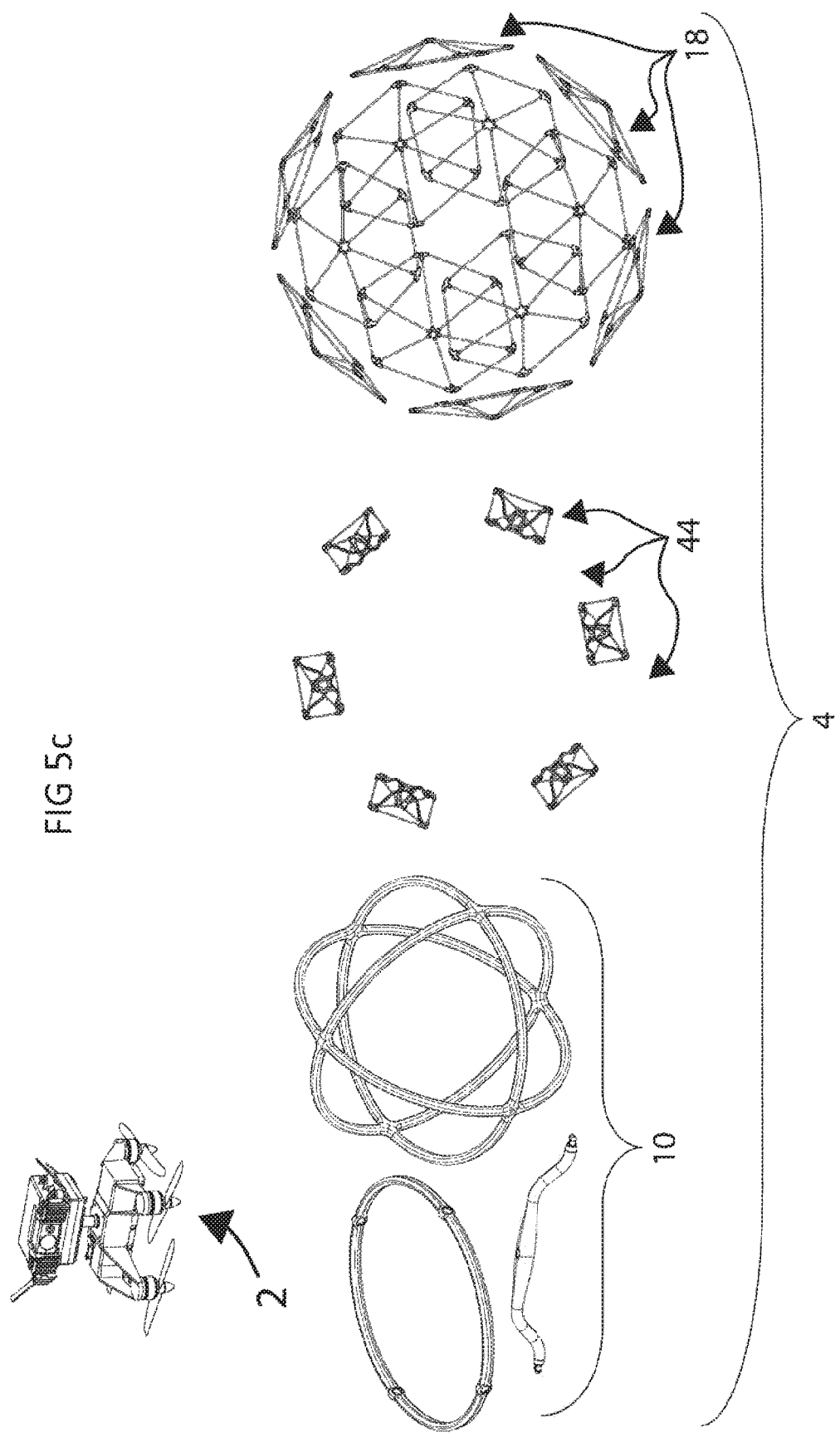
Figure 6A:
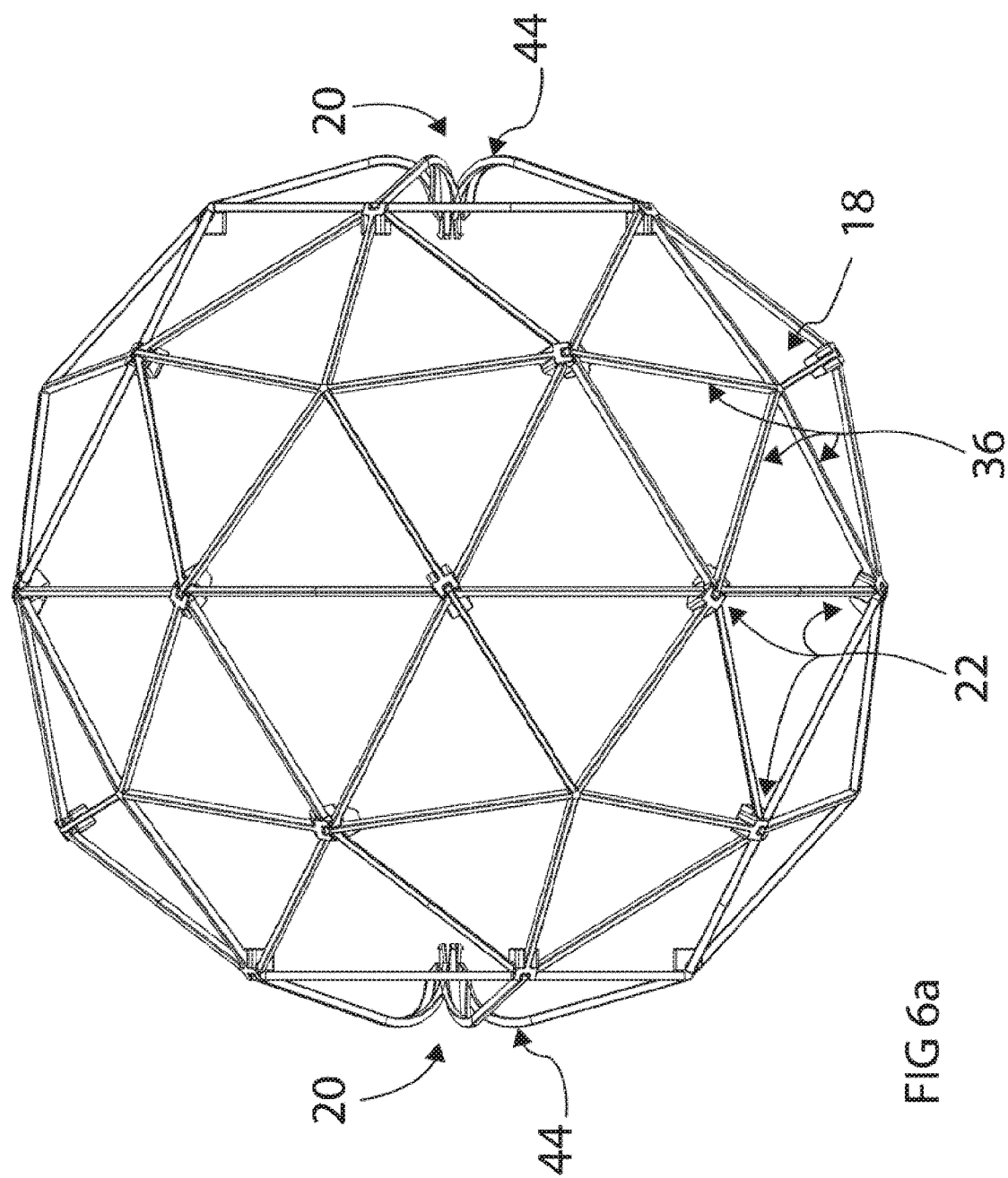
Figure 6B:
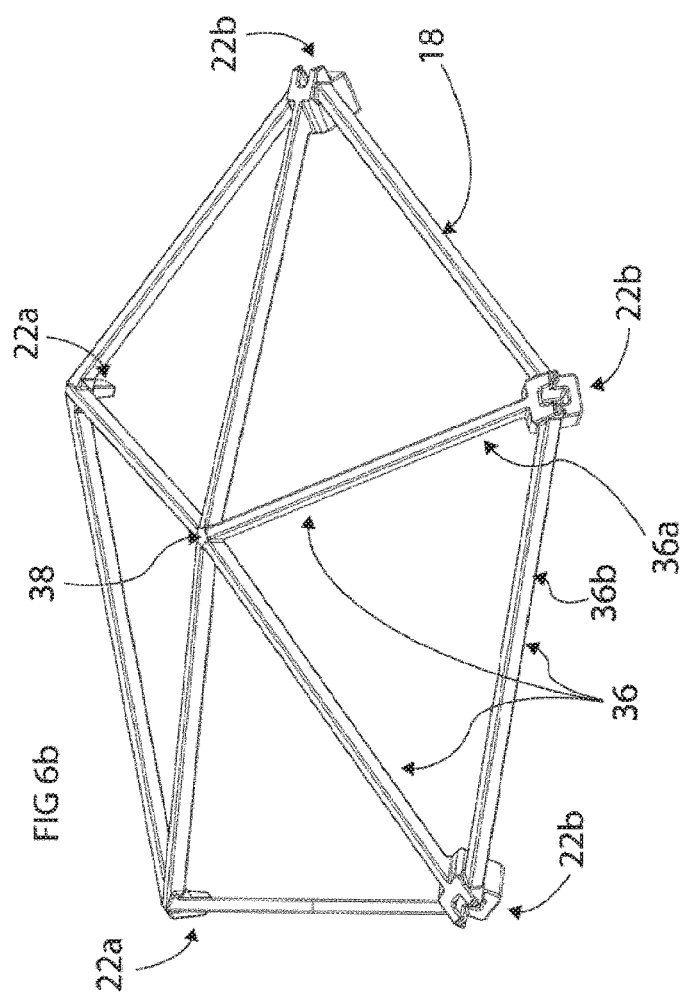
Figure 6C:
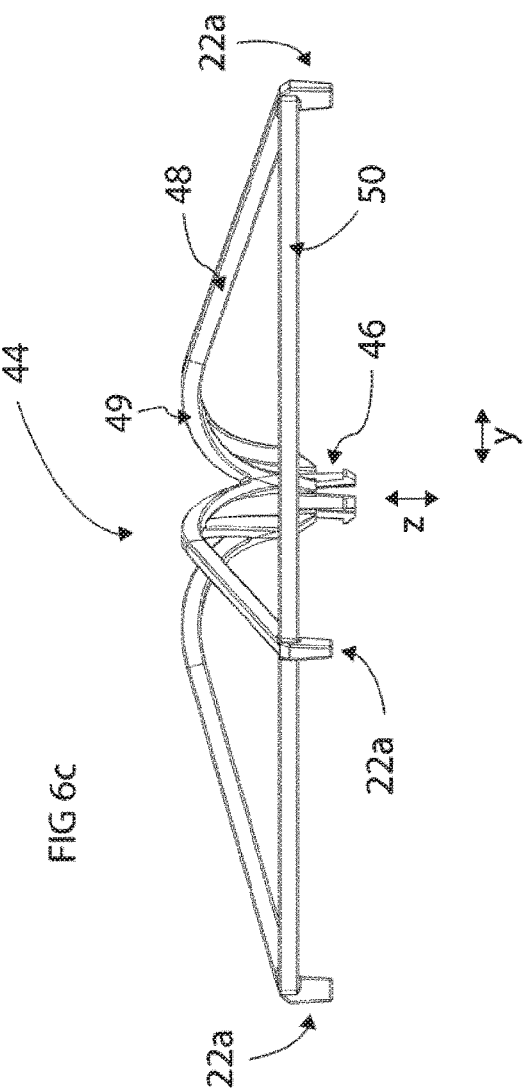
Figure 6D:
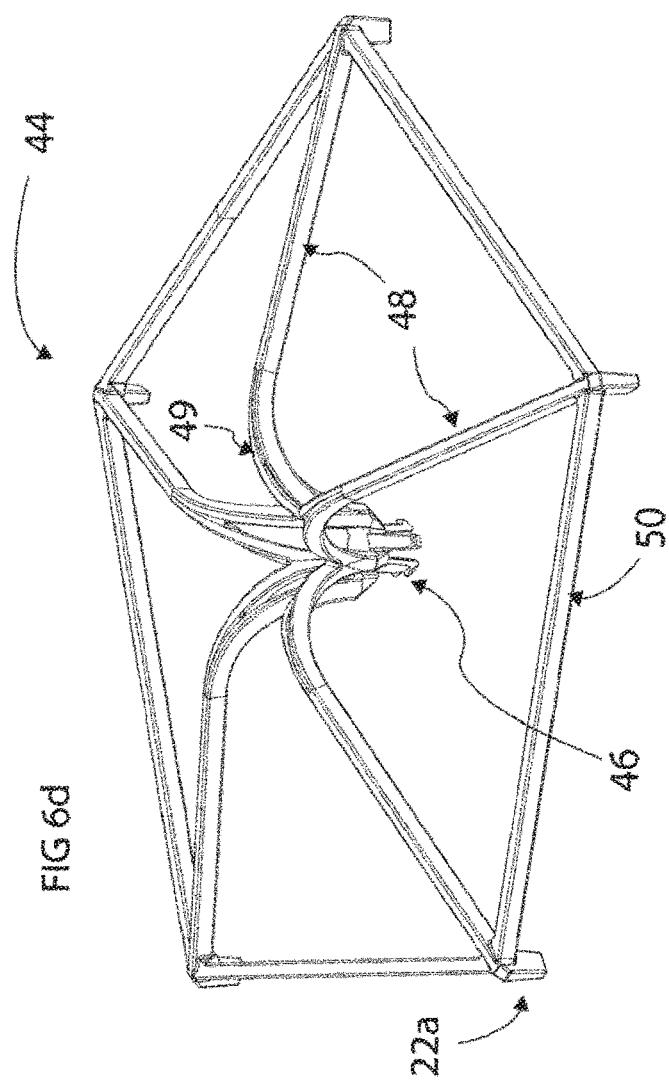
Figure 6E:
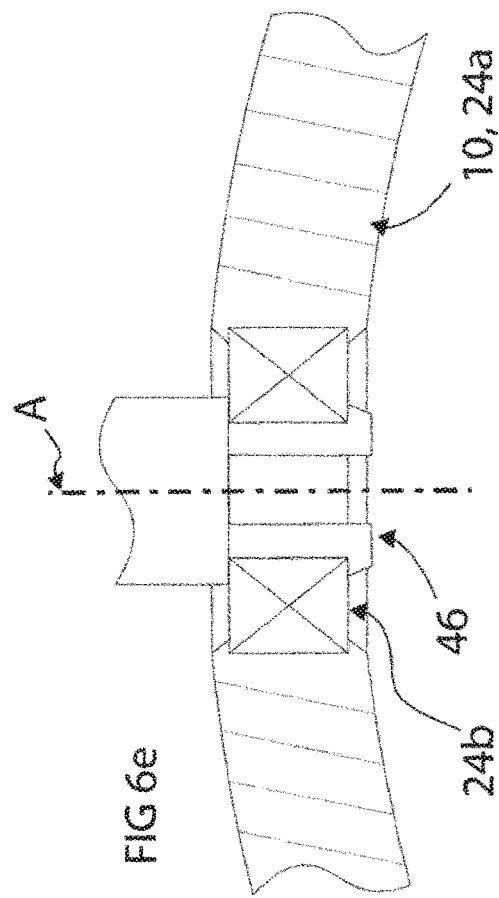
Figure 7A:
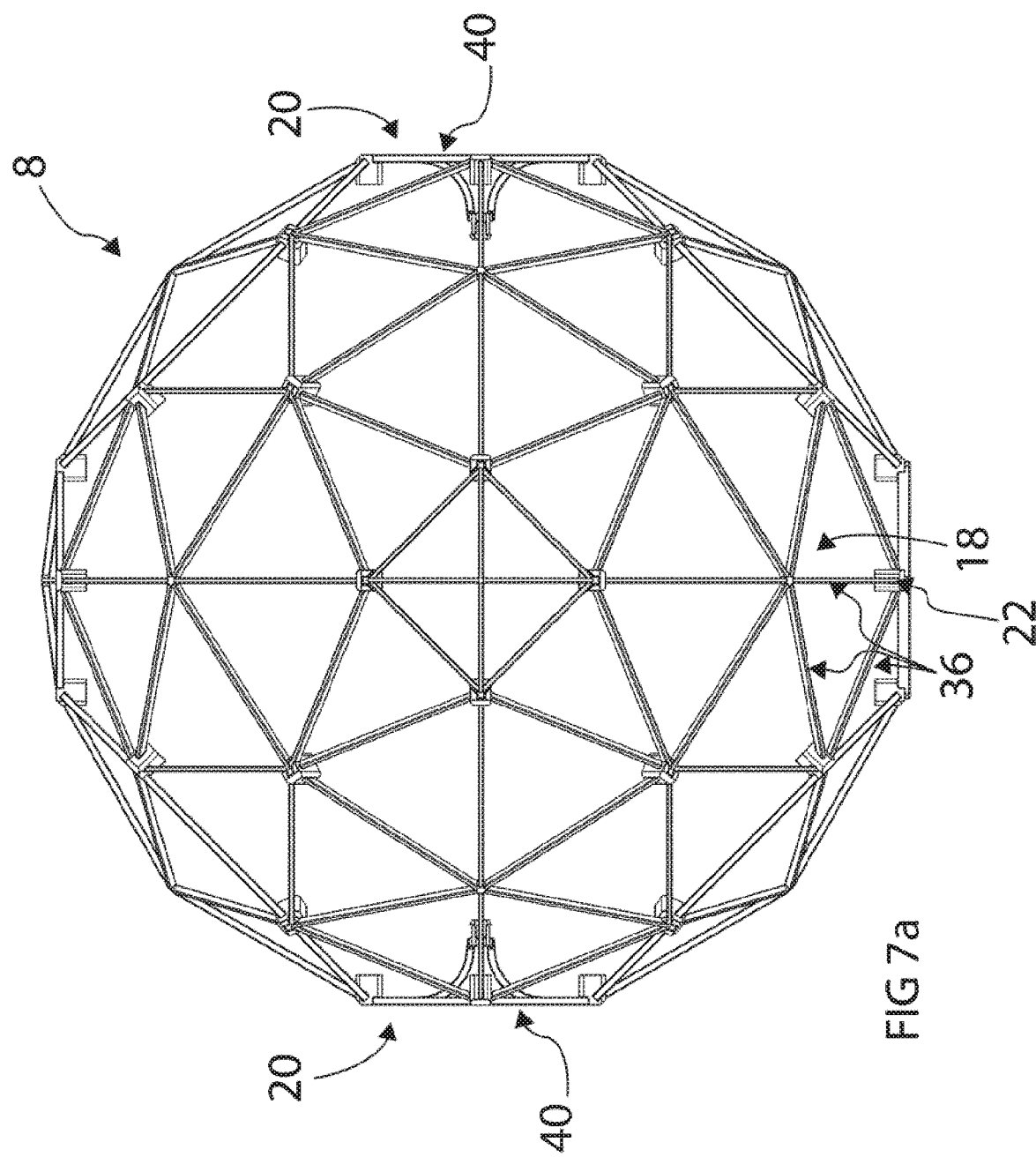
Figure 15:
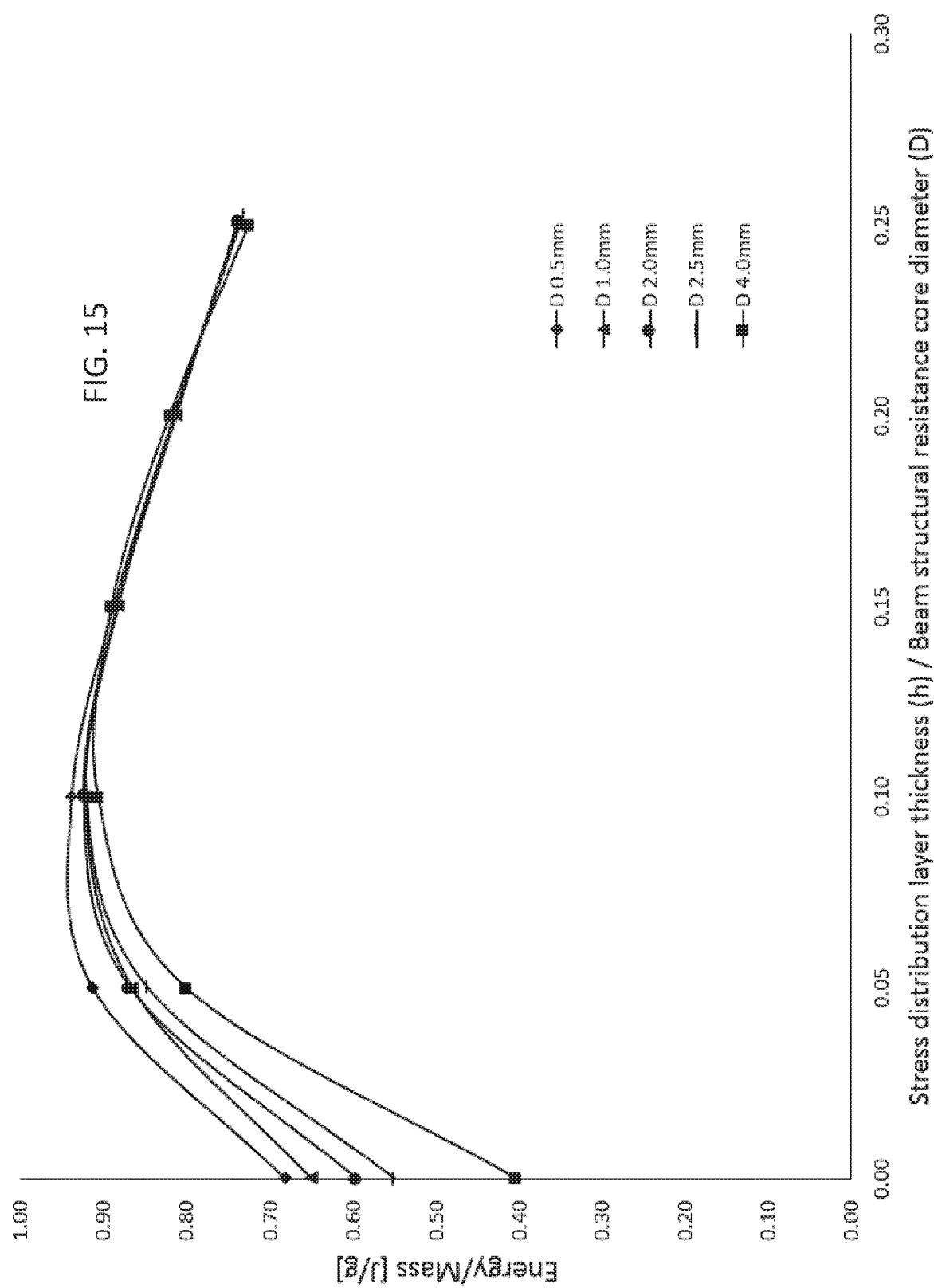
Figure 16:
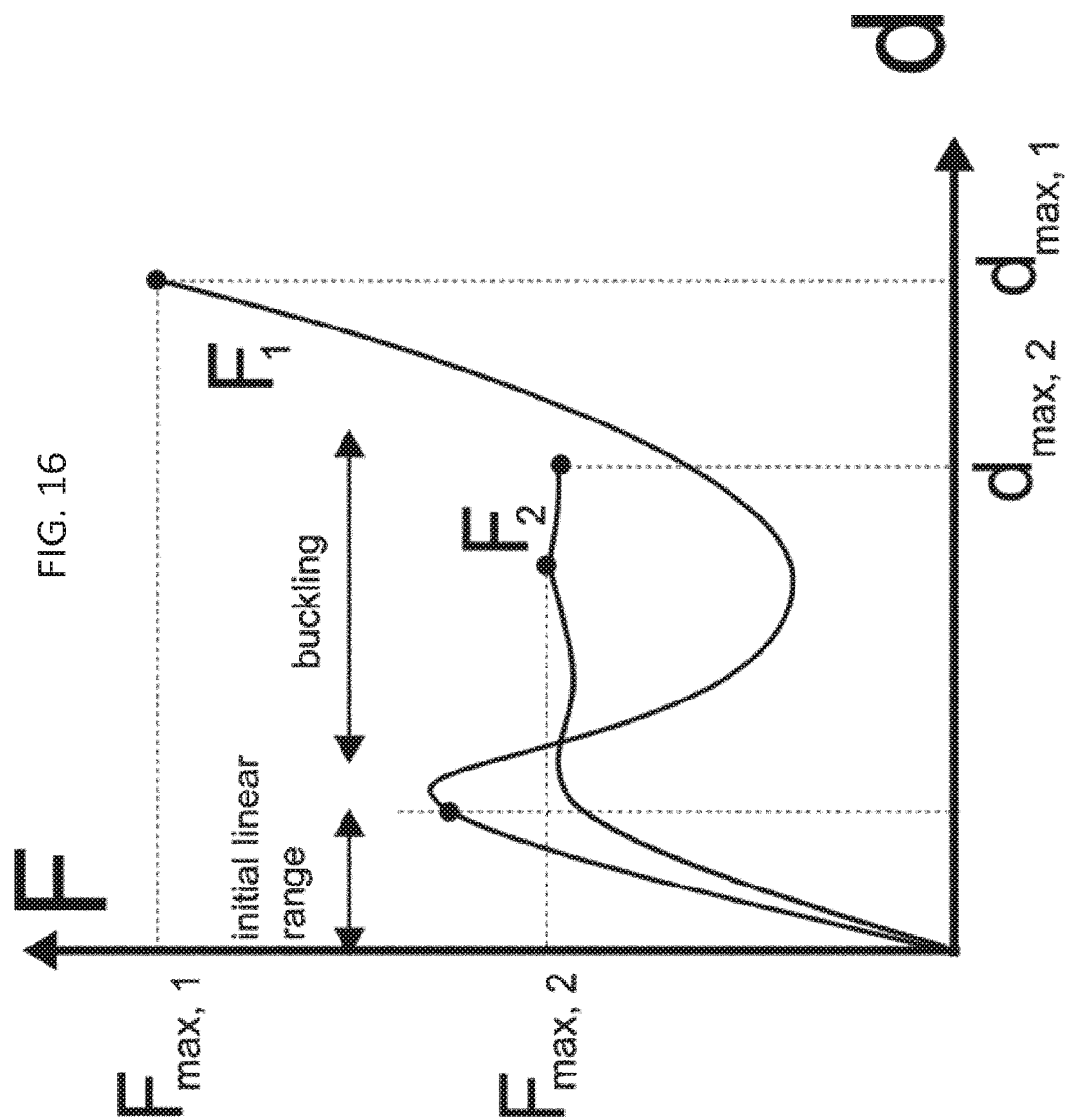
Figure 17:
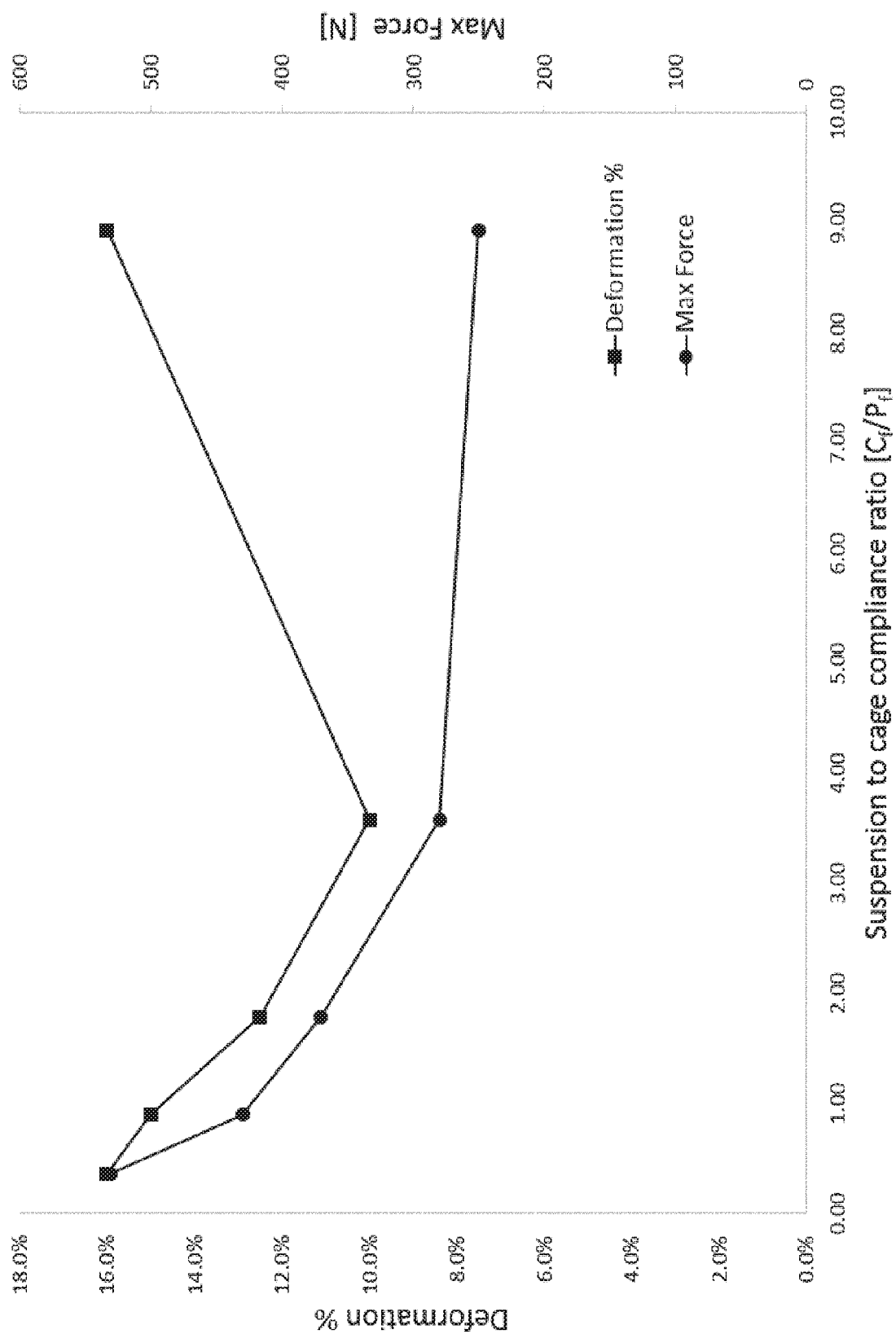

FIGS. 3b and 3c are schematic drawings illustrating the displacement of an inner structure relative to a protective outer cage coupled thereto via a suspension system according to embodiments of the invention, where FIG. 3b illustrates a compression displacement of the suspension system and FIG. 3c a shear displacement of the suspension system when an inertial force F acts upon the UAV upon collision with an external object;

FIG. 4a is a perspective view of a UAV with a protective outer cage according to an embodiment of the invention;

FIG. 5a is an exploded perspective view of the UAV of FIG. 4a;

FIGS. 5b to 5d are perspective exploded views of a UAV with protective outer cages according to other embodiments of the invention where FIG. 5c shows an embodiment with 6 suspension elements and FIG. 5d shows an embodiment with 12 suspension elements;

FIG. 6a is a view of a protective outer cage according to an embodiment of the invention;

FIG. 6b is a perspective view of a cage frame module of the protective outer cage of FIG. 6a according to an embodiment of the invention;

FIG. 6c is a side view of a cage frame suspension module of a suspension system of the protective outer cage of FIG. 6a according to an embodiment of the invention;

FIG. 6d is a perspective view of the embodiment of FIG. 6c;

FIG. 6e is a detail cross section view of the embodiment of a coupling between the suspension module of FIG. 44 to an inner frame according to an embodiment of the invention;

FIG. 6f is a side view of a cage frame suspension module of a suspension system of the protective outer cage of FIG. 6a according to an embodiment of the invention, where part of the suspension module is made of relatively soft material;

FIG. 6g is a side view of a cage frame suspension module of a suspension system, where part of the suspension module comprises a foam suspension element (54);

FIG. 7a is a view of another embodiment of a protective outer cage according to the invention;

FIG. 7b is a perspective view of a cage frame suspension module of a suspension system of the protective outer cage of FIG. 7a according to an embodiment of the invention;

FIG. 7c is a side-view of the cage frame module of FIG. 7b shown mounted to an inner support structure according to an embodiment of the invention;

FIGS. 7d, 7e and 7f are perspective views of different cage frame modules of the protective outer cage according to the embodiment FIG. 7a;

FIG. 8a is a simplified schematic development view illustrating assembly of cage frame modules and cage frame suspension modules according to an embodiment of the invention;

FIG. 8b is a view similar to FIG. 8a of another embodiment;

FIGS. 8c and 8d are illustrative simplified schemas showing male to female couplings and symmetrical male and female coupling between cage frame modules;

FIG. 9a is a perspective view of a frame module connector to interconnect cage frame modules of a protective outer cage according to an embodiment of the invention;

FIG. 9b is a perspective view of a pair of the frame module connectors of FIG. 9a coupled together;

FIGS. 10a and 10b show frame module connectors according to another embodiment of the invention with male, respectively female connector portions;

FIG. 10c shows a perspective view of the frame module connectors of FIGS. 10a and 10b coupled together;

FIG. 10d is a detail cross section view of the frame module connectors of FIGS. 10a and 10b coupled together;

FIG. 10e is a detail cross section view of frame module connectors coupled together through a fusible element;

FIGS. 11a and 11b are perspective views of male and female connector portions respectively of cage frame modules of a protective outer cage according to another embodiment of the invention;

FIG. 11c is a detail cross section view of the frame module connectors of FIGS. 11a and 11 b coupled together FIG. 12a is a detailed schematic view illustrating in cross section a beam of a protective outer cage according to an embodiment of this invention;

FIGS. 12b, 12c, 12d, 12e, and 12f show in cross section different variants of beams of a protective outer cage according to embodiments of the invention;

FIG. 13 illustrates a portion of a protective outer cage according to an embodiment of the invention colliding with a corner of an external object;

FIGS. 14a and 14b illustrate a distribution of local stress on a beam upon impact with a sharp object, FIG. 14b showing a beam without an outer stress distribution layer and FIG. 14a a beam with an outer stress distribution layer according to an embodiment of the invention;

FIG. 15 is a graph illustrating the gain in efficiency, expressed as energy that a coated rod can withstand before failure per weight unit, in relation to a ratio of the thickness h of the stress distribution layer over the average diameter or thickness D of the structural resistance core 40, considering the stress distribution layer having a Young's modulus 1000 times lower than the structural resistance core;

FIG. 16 is a graph illustrating a typical force F withstood by the flight propulsion system during an impact in function of the displacement d during the impact, for the case $F_1$ of an impact without suspension (case of FIG. 1a) and for the case $F_2$ with suspension (case of FIG. 2a). The case of FIG. 1a typically generates a force vs displacement profile involving non-linearities due to buckling rods and may thus have such an uneven profile. A well dimensioned suspension system reduces both the deformation and the peak force while withstanding the same amount of energy;

FIG. 17 is a graph illustrating the gain in performance obtained by selecting a suspension system with the correct rigidity for an outer protective cage of radius 200 mm with a given rigidity of K=50 N/mm. Depending on the rigidity ratio, the deformation (expressed relatively to the radius) can be minimized (which is preferred, in order to protect a larger volume) and the peak force can be minimized too (which is preferred, in order to reduce peak forces on the propulsion system). When the ratio is too low, the suspension is too stiff and the force profile may typically be similar to $F_1$ in FIG. 16. When the ratio is too high, the suspension is too soft, and although peak forces are reduced, the deformation of the suspension is larger than necessary.

Figure 1A:
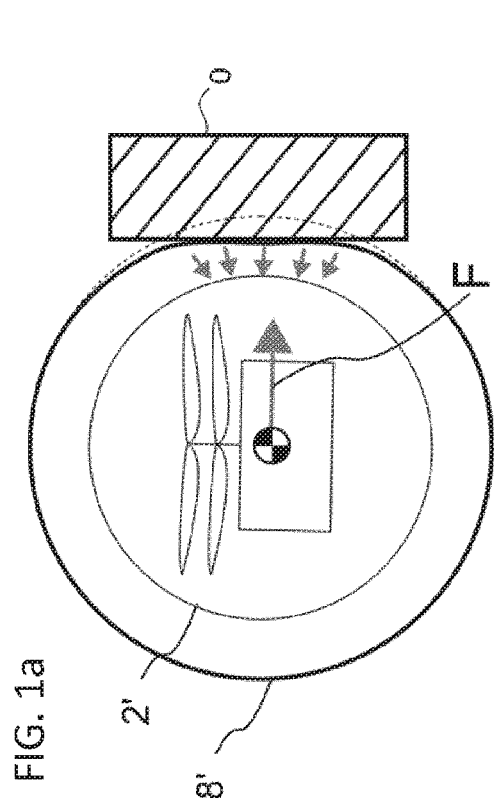
FIGS. 1a, 1b and 1c are simplified schematic illustrations of a UAV comprising a protective outer cage entering into collision with an external object, according to conventional technical solutions.
Figure 1B:
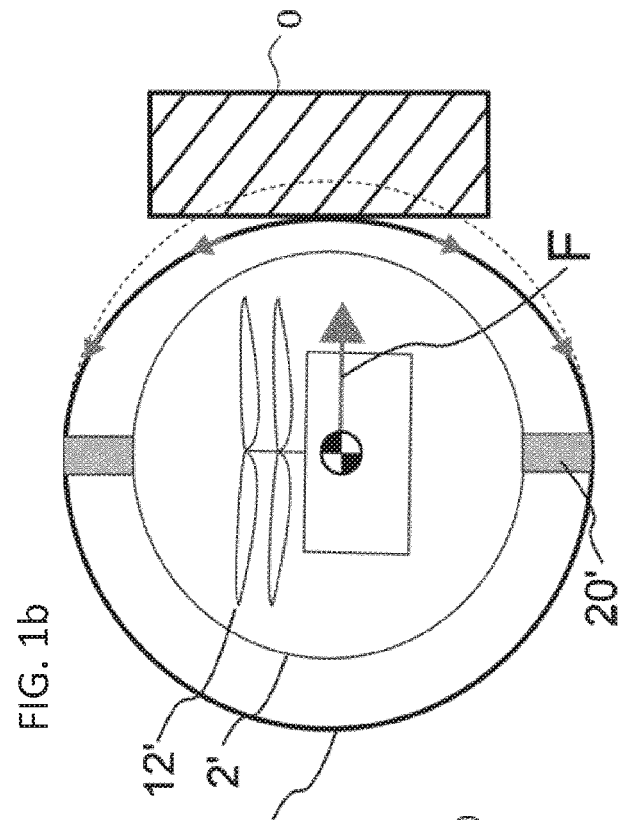
Figure 1C:
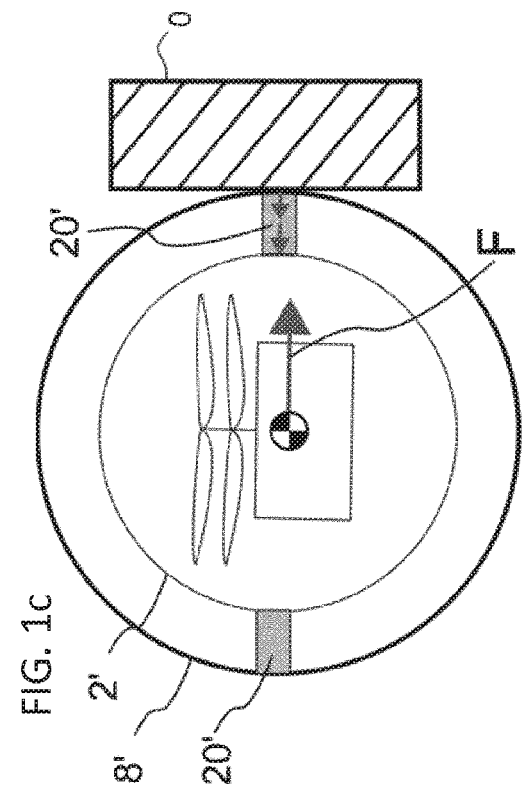

Referring to FIGS. 1a to 1c, conventional UAV protection systems colliding with an external object 0 are depicted schematically. Such known systems may generally comprise a propulsion system 2' mounted within an outer cage 8' coupled thereto via a coupling 20'. In conventional systems, the coupling 20' is typically a rigid coupling relative to the elastic deformability of the outer cage 8' such that the deformation of the coupling or connection 20' is negligible compared to the deformation of the outer cage 8'. Upon collision with an external object, the outer cage may deform locally as illustrated in FIG. 1a or more globally as illustrated in FIG. 1b between the substantially rigid supports 20'. The force F acting upon the outer cage is an inertial force due to the mass and velocity of the UAV. The mass of the UAV is the sum of the masses of the propulsion system 2' and of the outer cage 8'.

FIG. 1c illustrates a situation in which the UAV collides with an external object 0 at a position at or close to one of the substantially rigid supports 20', which in view of the low deformation, creates a large shock on the propulsion system. In view of the local distribution of load in the system of FIG. 1a and the partial distribution of load in the system of FIG. 1b, the protective outer cage may rupture locally or deform excessively such that the propulsion system 2' mounted therein enters into collision with the external object by bumping against the outer cage. In the scenario according to FIG. 1b, only a portion of the protective outer cage absorbs energy and the problem is similar to that described in relation to FIG. 1a. The problem in the scenario of FIG. 1c is the high inertial shock on the propulsion system. In the scenarios of FIGS. 1a and 1 b, in order to reduce deformation of the protective outer cage, the cage can be made more resistant. This however increases the mass of the outer cage and therefore the inertial forces of the UAV, as well as reducing performance by increasing the mass in flight. Aerodynamic performance is also adversely affected because of the increased cage size or the increased thicknesses of the cage structure for a given cage forming material.

It is generally known to have substantially rigid outer protective structure and a supple damping element mounted between the propulsion system and the outer chassis or suspension structure in order to absorb inertial energy upon collision between the vehicle and an external object. The substantially rigid outer structure in comparison to the relatively soft damper systems is however not optimal in conventional systems in terms of relation between the overall resistance to impact versus the overall mass, thus adversely affecting the performance of the device, in particular the autonomy of the UAV.

Referring now to FIG. 4, a UAV 1 according to an embodiment of the invention comprises a flight propulsion system 2 mounted to a support system 4. The flight propulsion system 2 comprises a propulsion unit 12 and a control unit 14 to control the propulsion unit. The propulsion unit may comprise one or more motors 28 driven by one or more propellers 30, a power source 32 in the form of a battery and optionally ailerons or other aerodynamic control elements for controlling the flight direction of the UAV. The control unit 14 may comprise micro-processors and various electronics circuit components to control the motors and variable aerodynamic control elements of the propulsion system. The control unit may further comprise wireless communications systems to receive commands transmitted remotely or transmit data to a remote unit wirelessly.

A surveillance system 6 comprising one or more cameras may be mounted to the flight propulsion system or to the support system 4. The cameras may be used for inspection purposes, taking still and/or moving images that may be stored locally in a memory of the control unit or camera and optionally transmitted wirelessly to a remote unit.

The surveillance system 6 or the flight propulsion system 2 may further comprise sensors such as inertial sensors that may be used for directional control of the UAV but also for registering collision and also detecting excessive inertial shocks that may be a sign of damage to components of the UAV. Sensors may further include strain gauges or other force sensing elements positioned on the components of outer protective cage and optionally on elements of an inner support structure 10 of the UAV in order to detect rupture of components.

In addition or alternatively, the camera system may comprise image recognition software configured to recognize the internal structure of the protective outer cage and to detect an anomalous shape resulting from rupture of a bean or other component of the protective outer cage.

The flight propulsion system may comprise various other configurations and components per se known in the prior art, for instance according to the system described in WO 2014198774 incorporated herein by reference.

Referring now to FIG. 4 and FIGS. 6a to 11b, the support system according to embodiments of the invention comprises a protective outer cage 8, an inner support structure 10 on which the flight propulsion system 2 is mounted, and a suspension system 20 coupling the outer cage 8 to the inner support structure 10.

The inner support structure 10 may comprise a rigid structure fixed to, or forming part of, the flight propulsion system 2, or may be coupled via rotational bearings or slidable guide elements to allow relative displacement along one, two or three degrees of freedom between the propulsion unit 12 and the outer cage 8. In a preferred embodiment, the inner support structure 10 comprises a gimbal system for instance as described in WO 2014198774. The gimbal system may for instance comprise a first gimbal 24 comprising a first support 24a mounted on at least one first support bearing 24b to the outer cage 8, and at least a second gimbal 26 comprising a second support 26a coupled to the first support 24a via a second support bearing 26b. Further, the propulsion unit 12 may be optionally mounted via a third bearing (not shown) to the second support 26a to allow rotation of the propulsion unit relative to the second support 26a. Details of such a gimbal system and other rigid structures are per se known and need not be described further in the present application.

According to an aspect of the invention, the outer cage 8 comprises a plurality of cage frame modules 18 that are manufactured as separate components and that may be assembled together to form the outer cage fully surrounding the flight propulsion system 2 mounted therein.

A cage frame module 18 may advantageously comprise a plurality of beams 36. In preferred embodiments, certain beams 36b may form generally the contour of a polygon, preferably of a regular polygon, for instance a triangle, square, pentagon, or hexagon. According to an aspect of the invention, the plurality of beams may further include radial beams 36a that interconnect corners of the polygon to a central joining part 38 at the other end of the radial beams. In preferred embodiments the polygon beams 36b may form a pentagon as illustrated in FIG. 6b, or a square as illustrated in FIG. 7d or 7e, or a hexagon as illustrated in FIG. 7f. The cage frame modules may, according to an embodiment, be integrally formed such that the polygon contour beams and radial beams form a single integral (inseparable) part.

Within the scope of the invention however, other cage frame module shapes incorporating circular, elliptical, irregular polygons and other shapes may be incorporated in the cage.

The beams interconnecting the corners of the polygonal shapes are preferably substantially straight, but variants having non-straight beam shapes may also be implemented.

In the embodiment illustrated in FIG. 6a, the outer cage 8 is assembled from cage frame modules 18 illustrated in FIG. 6b having a pentagonal shape with radial beams 36a connected together at an apex 38 such that the beams form triangular openings. In a variant, it would be possible to provide the cage frame modules 18 without the radial beams 36a. In the latter configuration, outer cage will comprise polygonal shaped orifices and triangular shaped orifices, the triangular shaped orifices due to the assembly arrangement of the polygonal shapes together. In the embodiment of FIG. 6a, the outer cage 8 may be formed principally or only of an assembly of pentagonal cage frame modules.

In the embodiment illustrated in FIG. 6a, a connector portion 22a, 22b is formed at each corner of the polygon whereby the connector portion may be a female connector portion 22a or a male connector portion 22b as will be discussed in more detail further on. In this example, the cage frame modules are provided with integrally formed male and female connector portions 22a, 22b, the male connector portion of one cage frame module being configured to couple to the female connector portion of an adjacent cage frame module. In the illustrated embodiment, the pentagon shaped cage frame module has two male connector portions and three female connector portions allowing the assembly arrangement illustrated in FIG. 8b that shows a simplified developed state of the various cage frame modules 18 making up the outer cage 8. Elements 44 represent cage frame suspension modules 44 that are part of the suspension system 20 that will be described in more detail further on.

It may be noted in relation to the arrangement of FIG. 8b and the embodiments of FIGS. 6a and 6b, that each cage frame module 18 may alternatively comprise three male connector portions and two female connector portions (an inversion of the system illustrated in FIG. 8b) whereby in such case the cage frame suspension modules 44 are provided with each five female connector portions instead of five male connector portions as illustrated.

Instead of individual male and female connector portions as illustrated in FIG. 8c, each corner of the polygon shaped cage frame module may be provided with an identical connector, comprising both male and female connector portions that are complementary and allow interconnection between the cage frame modules irrespective of their orientation as illustrated schematically in FIG. 8d. The pair of male and female connection portions is illustrated in FIG. 9a whereby the male portion 22a is complementary to the female portion 22b and thus when identical parts are facing each other the male portion inserts into the complementary female portion and vice-versa to allow the two parts to clip together as illustrated in FIG. 9b. The connection is reversible and the clips can be un-clipped by pressing on the release knob 55, which is advantageously located on the inner side of the outer protective cage. The frame module connector 22 illustrated in FIGS. 9a and 9b may be a separately manufactured frame module connector 22 comprising the male and female connection portions 22a and 22b and a plurality of beam anchor portions 52 configured to lodge ends of beams 36 (radial beams 36a and polygon contour beams 36b) to the connector. The beams may be fixed to the connectors by welding (for instance ultrasonic welding), adhesive bonding, interference fit, or various other mechanical or permanent or clamping methods per se known in the art. The connector 22 illustrated in FIGS. 9a and 9b may however also be formed as an over molding on the respective beams 36, or as an integral part of the beams, and thus form an integral inseparable part of the cage frame modules. Other manufacturing techniques including additive manufacturing (for instance employing 3D printing) may be employed to integrate the connectors 22 to the beams.

In the frame module connectors 22 of the embodiments shown in FIGS. 10a to 10c, individual male connector portions 22a and female connector portions 22b are provided at corners of the polygon beams, corresponding thus to the connection system illustrated schematically in FIG. 8b.

According to an aspect of the invention, the frame module connectors may be configured to unplug or separate under a bending strain of between 70% and 90% of a bending strain to failure of the beams. This allows the cage modules to unplug or disassemble in order to reduce the occurrence of irreversible failure of beams of the outer cage in case of an impact that has sufficient magnitude to rupture beams of the cage.

As illustrated in FIGS. 11a and 11b, other male and female connector portion shapes may be provided. In the embodiments of FIGS. 11a and 11 b the male connector portion comprises a post, for instance a rectangular, square, polygonal, elliptical, or circular prismatic shaped post that inserts into a complementary cavity 23b of a female connector portion 22b. A step 25b inset in the female connector portion 22b provides a cavity receiving the corner portion 25a of the cage frame module such that the polygon contour beams 36b of the interconnecting cage frame modules are positioned at essentially the same height as best illustrated in FIG. 11c.

In FIG. 10e an alternative embodiment of a frame module connector 122 is illustrated. In this embodiment, the connector portions 122a are coupled together by a frangible or breakable (also called "fusible") connecting tie 122b. The fusible connecting tie 122b is inserted in orifices of the connector portions 122a and tied securely to hold the connector portions together. The fusible connecting tie is provided with a material thickness and strength at least along a portion thereof that is configured to rupture due to the tensile stress in the tie resulting from a bending stress on the beams coupled to the connector 122 that exceeds a certain threshold. The threshold is preferably selected at a bending stress in a range from 70% to 90% of the stress at rupture of the beam. The tensile stress in the tie results from the pivoting of the connector portions 122a due to the force F that spreads apart the interfaces 122c thus lengthening the path needed for the tie.

Referring to FIGS. 7a to 7f and FIG. 8a, in another embodiment according to the invention, the outer cage comprises cage frame modules 18 including hexagon shaped cage frame modules as illustrated in FIG. 7f and square shaped cage frame modules 18 as illustrated in FIG. 7d and FIG. 7e. Similar to the polygon shaped cage frame modules illustrated in FIGS. 6a and 6b, the polygon contours of the embodiments of FIGS. 7d and 7f are formed by polygon contour beams 36b that are provided with connector portions 22a, 22b at their corners and further provided with radial beams 36a that interconnect the corners of the polygon to a central beam joining part 38 at a apex of the cage frame module 18. The rectangular or square shaped polygonal cage frame modules 18 illustrated in FIGS. 7e and 7d may be provided with radial beams 36a or as shown in FIG. 7d or without radial beams as shown in FIG. 7e.

An assembly connection scheme is illustrated in FIG. 8a whereby the square shaped cage frame modules interconnect to four hexagon shaped cage frame modules. In the illustrated embodiment, the hexagon shaped cage frame modules are provided with four female connectors and two male connectors and the square cage frame modules are provided with four male connectors as illustrated. Of course these connections can be inverted, in other words the male connectors can be female and vice versa.

Instead of male and female connectors, a solution as illustrated in FIG. 8d or FIG. 9a in which each connector is provided with complementary male and female portions such that all the connectors are identical and can be coupled together with their male and female complementary parts engaging. Connectors according the various configurations already described in relation to the embodiment of FIG. 6a, 6b may also be employed in the embodiments of FIGS. 7a and 7d to f.

Referring now to FIGS. 6a, 6c, 6d, 7a, 7b and 7c, embodiments of the suspension system shall now be described in more detail. The suspension system according to embodiments of the invention may comprise a cage frame suspension module 44 that may advantageously comprise an essentially identical or similar polygon contour shape with one of the cage frame modules 18 of the outer cage.

For the outer cage embodiment illustrated in FIG. 6a, a polygonal shaped cage frame suspension module 44 as illustrated in FIGS. 6c and 6d may advantageously be utilized. The cage frame suspension module 44 may thus be assembled to the other cage frame modules 18 in a manner similar to the assembly of the other cage frame modules 18 to each other, for instance according to the arrangement layout illustrated in FIG. 8b.

In the embodiment illustrated in FIGS. 6c and 6d, the cage frame suspension module comprises frame connection beams 50 forming a polygon contour connected at their corners to radial suspension beams 48 that flair outwardly initially and then curve inwardly at their end portions 49 joining together at a support portion 46 that may form a bearing support portion 46. The support portion 46 is configured to be coupled to the inner support structure 10. In the illustrated embodiment, the coupling is provided by means of elastic latch arms on the bearing portion 46 that engage in a complementary orifice with a locking shoulder on the first support 24a in the form of a beam of the inner support structure 10. The first support 24a can rotate around the axis A of insertion of the latches into the corresponding bearing orifice 24b.

The radial suspension beams 48, or a portion of the suspension beams, for instance the end portions 49, may be provided as part formed of a material that is different from the material of the beams 36 of the cage frame modules 18, in particular that has a greater elasticity (lower Young's modulus) than cage frame module beams 36. Materials with lower Young's modulus typically have a Young's modulus in the range of 100 MPa to 400 MPa with elongation of 80% to 200%. Materials with higher Young's modulus typically have a Young's modulus in the range of 2 GPa to 4 GPa with elongation of 15% to 30% of elongation. Materials with lower Young's modulus that may be used include polymers such as polyamide (PA), polypropylene (PP), expanded polypropylene (EPP), polyurethane, and polycarbonate. Alternatively, the cage frame suspension module 44 as a whole may be made of a different material than the cage frame modules 18 forming the rest of the protective outer cage 8.

In the embodiment illustrated in FIG. 6f, the cage frame suspension module 44 comprises frame connection beams 50 forming a polygon contour connected at their corners to radial beams 51 that join together at the centre of the polygon similarly to a cage frame module 18. A suspension element 53, which is made of different and more elastic material (having a lower Young's modulus) than the frame connection and radial beams 50, 51 is mounted on an inner side of the cage frame suspension module 44. The suspension element comprises radial suspension beams 48 connected to each corner of the polygonal frame connection beam structure and join together at a central support portion 46 that may form a bearing support portion 46. The support portion 46 is configured to be coupled to the inner support structure 10. The inner support structure is thus coupled to the outer cage via the relatively more elastic suspension element 53.

In a variant, as illustrated in FIG. 5c, the suspension system comprises six suspension modules 44, that couple to the inner structure 10, which comprises three perpendicular rings, their intersections connecting to the six suspension modules 44.

In a variant, as illustrated in FIG. 5d, the suspension system comprises a plurality of elastic elements 144, for instance in the form of elastomer studs, that interconnect the cage frame module 18 to the inner structure. In this variant, the cage frame connection module 18 in conjunction with the elastic elements 144 form the equivalent of a cage frame suspension module of the preceding embodiments. The inner structure 10 comprises a geodesic 1v and connects to the suspension elements 144 at each corner of the geodesic 1v, whereby the suspension elements connect to the center of each cage frame module 18.

The structure of the cage frame suspension module is configured to provide a degree of elastic resilience in the direction of compression Z and in the tangential direction or shear direction Y that is related to the degree of elastic resilience of the outer cage in compression as a whole. As best illustrated in FIGS. 3a, 3b and 3c, a general force F pressing on the outer cage 8 causes an elastic deformation of a displacement distance d. This can be considered as dependent on the general stiffness of the outer cage under compression. This measurement is considered to be taken for a range of forces where the stiffness ratio (F/d) does not exhibit large non-linear behavior, in particular due to buckling of a beam of the outer cage. The magnitude of the force F applied on the outer cage is thus assumed to be less than the magnitude of a force that could cause a beam of the cage to buckle. When a force F, for example due to inertia, is applied on the propulsion system 2 and inner support structure 10 relative to the outer cage 8, a compression and traction of the first and second opposing suspension elements 20 may occur as illustrated in FIG. 3b, or a shear displacement as illustrated in FIG. 3c, or a combination of compression and shear may occur. Assuming that the same magnitude of force F as in the case of FIG. 3a (causing compression displacement d) is applied in the compression and traction situation of FIG. 3b, a displacement c of the inner support structure 10 relative to the outer cage 8 occurs. In FIG. 3c, a shear displacement s between the inner support structure and outer cage 8 by the suspension elements 20 occurs.

The material, dimensioning and shape of the suspension elements 20 are configured such that the ratio of compression/traction displacement c and shear displacement s divided by a unit force F is advantageously within a range of 1 and 10 times the ratio of compression displacement d of the outer cage divided by the unit force F. Note that the displacement d may be measured in an essentially initial linear range up to about 90% of a maximum force that may be applied to the outer cage before a buckling of one or more beams of the outer cage, and that the compression/traction displacement c and shear displacement s characterize all the suspension elements and may be generalized to any number of suspension elements above 1. According to an aspect of the invention, the relative elasticity of the outer cage and the suspension elements thus satisfy the following relationships:

$$P_f \leq C_f \leq 10\ P_f \text{ and } P_f \leq S_f \leq 10\ P_f$$

where $P_f$: ratio of compression displacement d of outer cage divided by a force F $C_f$: ratio of compression/traction displacement c of the suspension system divided by the force F $S_f$: ratio of shear displacement s of the suspension system divided by the force F More preferably the ratios are found within a range of 2 to 5 in particular for cages in a 100 mm to 500 mm diameter range, meant to withstand 1 to 10 Joules of collision energy:

$$2P_f \leq C_f \leq 5\ P_f$$

$$\text{and } 2P_f \leq S_f \leq 5\ P_f$$

The elasticity of the cage frame suspension modules 44 in compression and in shear (tangential) displacement advantageously allows the inertial energy of the UAV on impact with an external object to be well distributed throughout the outer cage and within the suspension elements thus optimizing the distribution of load and reducing the shocks (deceleration) on the propulsion system. This is best illustrated in FIG. 2a and FIG. 2b illustrating the distribution of load through the suspension system and around the cage in a well distributed manner when the degree of compression and shear on the suspension system is configured to fall within a certain range of the compression elasticity of the outer cage. The elasticity of the suspension also provides a mostly uniform response for any impact location, without any particularly stiff or weak impact location.

Referring to FIGS. 7a to 7c, in this embodiment the cage frame suspension module comprises frame connection beams 50 forming a square or generally square contour connected at corners to suspension beams 48 that curve inwardly to end portions 49 joining together at a support portion 46 configured to be coupled to the inner support structure 10.

In the illustrated embodiment, the coupling is provided by means of elastic latch arms with a locking shoulder on the bearing portion 46 that engage in a complementary orifice of a bearing, for instance a roller bearing, mounted in the first support 24a in the form of a beam of the inner support structure 10. The first support 24a can rotate around the axis A of insertion of the latches into the corresponding bearing orifice 24b.

The substantially square shaped frame connection beam section 50 with connector portions 22a at the corners of the beams forming the polygon shape and non-straight suspension beams 48 that join the corners of other polygon to a central support portion 46 that may for instance form a bearing support portion with latches 45 similar to the previously described embodiment. The material of the suspension beams or portion thereof or the material of the cage frame suspension module 44 illustrated in FIGS. 7b and 7c may also be different to the material forming the beams of the cage frame modules 18 illustrated in FIGS. 7e, 7d and 7f.

The bearing support portion 46 may comprise various coupling configurations that are per se known to the skilled person to couple to an inner support structure. It may be further noted that in the case of an inner support structure that is fixedly connected to the suspension system 20, a clip locking mechanism, or an interference fit coupling, or various other fixing arrangements per se known to the skilled person would be possible between the bearing support portion 46 and the inner support structure 10.

It may also be noted that the shapes dimensions and materials of the suspension beams and of the suspension system as a whole may varied in order to adjust the module of elasticity in the compression direction Z or in the lateral or shear direction Y within the scope of the invention in order to achieve the range of values according to the invention discussed above.

Referring now to FIGS. 12a to 12f, starting with FIG. 12a, a cross-section of a beam according to an embodiment of the invention is illustrated. The beam comprises a structural resistance core 40 that provides the structural resistance of the beam, in particular in bending, traction and compression of the beam. The beam can have different cross-section shapes including hollow portions 43. The structural resistance core 40 may advantageously be made of a carbon fiber reinforced material, for instance a unidirectional carbon fiber resin matrix material that is per se known in the art. Other materials with a high Young's modulus per se known in the art such as other composite materials with carbon, hemp, aramid, polyethylene or glass fibres and with PA, PP, polyurethane or Polyether ether ketone (PEEK) matrices and their combination in hybrid composites, or metals such as aluminium, steel, titanium, stainless steel, or wood such as balsa wood, bamboo, or plastics such as PA, PP, polyurethane, polycarbonate or PEEK that have a high strength to weight ratio may also be used.

According to another aspect of the invention, the beams 36 further comprise a stress distribution layer 42 made of a material configured to distribute local stress applied on the beam over a larger surface area of the structural resistance core 40. The effect of this stress distribution layer is to prevent rupture of the structural resistance core 40 due to a local high stress, for example by collision of the UAV with a sharp object or corner of a hard object. The stress distribution layer improves the strength, the maximum strain and therefore the absorbed energy. Increases from 95% up to more than 300% of the strain energy to failure, for beams with a stress distribution layer compared to beams without, have been measured in static and dynamic loading conditions. Specific strain energy for beams with a stress distribution layer compared to beams without is increased by more than 50%.

The stress distribution layer is advantageously made of a material that has a Young's modulus that is less than 20%, preferably less than 10% of the Young's modulus of the structural resistance core 40. In an advantageous embodiment, the stress distribution layer is made of a material that has a Young's modulus that is in a range or 2% to 0.1% of the Young's modulus of the structural resistance core 40. For anistropic materials, the value of the Young's modulus considered for the above relationship is the Young's modulus of the material in the principal direction of stress/strain.

For the beams this will mean for instance the Young's modulus seen under bending of the beam and for the stress distribution layer 42 the Young's modulus seen in the direction of compression of the layer towards the surface of the structural resistance core 40.

Possible materials that may advantageously be used as a stress distribution layer include Thermoplastic elastomer (TPE), Thermoplastic polyolefin (TPO), polyurethane, toughened epoxy, rubber, EPP, PA, PP, and silicone polymer.

Preferably the thickness h of the stress distribution layer is lower than 30% of the average diameter or thickness D of the structural resistance core 40. An advantageous thickness of the stress distribution layer is in the range between 5% and 15% of the average diameter or thickness D of the structural resistance core 40. As illustrated in FIG. 15, tests with different structural core diameters and coating thicknesses show that the energy absorption capability per unit mass of the beam increases rapidly with low values of h/D and is already effective as of 0.03<h/D and tops off in the range 0.05<h/D<0.15 but is effective up to h/D<0.3. Therefore, in advantageous embodiments, the stress distribution layer may typically be provided with a thickness h that is in a range of 3% to 30% the thickness or diameter D of the structural resistance core (0.03<h/D<0.3), preferably in a range of 4% to 20% (0.04<h/D<0.2) the thickness or diameter of the structural resistance core, more preferably in a range of 5% to 15% (0.05<h/D<0.15) the thickness or diameter of the structural resistance core.

In an advantageous embodiment, the structural resistance core has a cylindrical profile as illustrated in FIG. 12a and FIG. 12d. Other shapes of the structural resistance core are however possible, such as rectangular shapes as shown in FIGS. 12b and 12c, trapezoidal shapes as shown in FIG. 12e, partial circular shapes as shown in FIG. 12f, or elliptical shapes. The shapes may be configured for stress distribution or for simplifying manufacturing processes. The stress distribution layer 42 may be arranged around the entire circumference or periphery of the structural resistance core as shown in FIG. 12a, for instance in order to simplify the coating procedures or the assembly procedures by having the beams coated before assembly to form the cage frame modules. The stress distribution layer may however be provided essentially or substantially only on an outer side as illustrated in FIGS. 12b to 12f where the beam may enter into contact with an external object 0, since the inner side of the cage facing the propulsion system is inherently protected from impact. This distribution layer provided only on an outer collision side of the beams optimizes the function for the lowest weight to impact resistance. Also, the width of the beam is reduced to minimize air resistance and/or to minimize viewing hindrance to a camera installed within the outer cage, for instance installed on the propulsion system.

FIG. 13 illustrates an outer cage impacting an object 0 with a sharp corner. FIGS. 14a and 14b illustrate the stress distribution S1, S2; R1, R2, R3, R4, R5 on a structural resistance core 40 of a beam 36 of the outer cage of FIG. 13 impacting the object. FIG. 14a illustrates the stress distribution on a structural resistance core 40 of a beam with stress distribution layer (the stress distribution layer has been removed from the representation in FIG. 14a for comparison purposes) and FIG. 14b illustrates the stress distribution on a structural resistance core 40 of a beam without stress distribution layer. The density of the hatching represents schematically the magnitude of stress, the denser hatching representing higher stress than less dense hatching. It can be seen in these illustrative schematic representations that the magnitude of the stress in zones R1, R2, R3, R4 of the bare core (FIG. 14b) decreases as a function of the distance from the point of impact of an external object at the surface of the core 40 but are nevertheless considerably higher than the magnitudes of stress in zones S1, S2 under the point of impact impinging upon the stress distribution layer (not shown) of the core with stress distribution layer (FIG. 14a).

The stress distribution layer may be provided as different materials including Thermoplastic elastomer (TPE), Thermoplastic polyolefin (TPO), polyurethane, toughened epoxy, rubber, EPP, PA, PP, and silicone polymer, or combinations of these materials. The stress distribution layer may be applied on the beam by various methods including (co-)pultrusion, coextrusion, powder coating, dip coating, water transfer dipping, spray coating, bonding a separately formed material layer to the core, overmolding, casting, and over thermoforming of membranes. Two or more of the abovementioned materials and processes can be combined to reach the surface layer shape and mechanical properties.

Advantageously, the combination of the low modulus stress distribution layer 42 and the high modulus structural resistance core 40 allows to provide a collision resistant beam that has a very high ratio of structural resistance against rupture by impacting external objects in relation to the mass.

In addition, the stress distribution layer increases the safety of a permanently damaged structural resistance core for the user by providing a protection layer. The permanently damaged structural resistance core may otherwise display sharp elements that may be dangerous to the user.

In a variant (not shown), the beam structural resistance core may comprise a variable thickness (diameter, height) over its length, the center portion of the beam having a greater thickness than portions at the extremities of the beam. This shape advantageously improves resistance to buckling of the beam thus further optimizing the resistance to impact of the outer cage for a given mass.

In a variant, a damping mechanism may be included in the suspension in order to further reduce the deformation and the peak force (for instance as illustrated in FIG. 16) while withstanding the same amount of energy. The damping mechanism can be configured in various manners, based on principles per se known in the field, including:
from the properties of the materials used for the suspension (e.g. rubber);
a damping mechanism generating friction on deformation;
a damping mechanism based on the motion of liquids, powders or gas contained within the suspension.

The amount of damping is characterized by a damping ratio $zeta=Ds/(2*sqrt(Cf*Mi))$ where Ds is the damping in N/(m/s) of the suspension (in case of non-linear damping with respect to velocity, Ds is the damping at the typical impact speed), Mi is the combined mass of the inner support structure 10 and flight propulsion system 2, and Cf is a ratio of compression/traction displacement c of the suspension system for said pre-buckling force F applied between said outer cage and said flight propulsion system or inner support structure (note that Cf can be substituted by Sf to calculate the shear or tangential damping ratio).

It is advantageous to provide a damping mechanism where the damping ratio $zeta>0.3$, in particular in the range: $0.4<zeta<0.6$.

The high resistance to mass ratio of the outer cage is advantageous not only for the autonomy and performance of the UAV in flight, but also reduces the surface area of the structure elements of the outer cage that block vision for cameras and sensors positioned inside the cage, for instance on the propulsion system. In other words, the adverse interference of the outer cage with cameras and other surveillance systems positioned within the cage is minimized.

List of references used obstacle 0
flying robot 1
    flight propulsion system 2
        propulsion unit 12
            motors 28
            propellors 30
            power source 32
                battery
                      charge connector 34
            coupling 27 to inner frame
        control unit 14
            wireless communications system
        sensors
            inertial sensors
            navigation/direction sensors
    support system 4
        outer protective cage 8
            cage frame modules 18
                beams 36 (radial 36a, polygon contour 36b)
                    structural resistance core 40
                        carbon fibre beam
                    stress distribution layer 42
                    hollow core 43
                beams joining part 38
                    connector portions 22a (male), 22b (female)
        suspension system 20
            cage frame suspension module 44
                bearing support portion 46
                    latches 45
                suspension beams (non straight) 48
                    (inwardly) curved end portion 49
                suspension element 53
                foam suspension element 54
                frame connection beams (polygonal) 50
                    square, pentagon, hexagon, triangle....
                connector portions 22a (male), 22b (female)
            elastic elements 144
        frame module connector 22, 122
            male portion 22a
                post 23a
            female portion 22b
                cavity 23b
            release knob 55
            beam anchor portion 52
            connector portions 122a (orifices)
                frangible tie 122b -continued List of references used inner support structure 10 (e.g. gimbal system)
   (first gimbal) 24
      first support 24a
      first support bearing 24b
      second support bearing 24c
   (second gimbal) 26
      second support 26a
      third support bearing 26b
      fourth support bearing 26c
surveillance system 6
   camera(s)
$P_f$: ratio of compression displacement d / force F of outer cage
$C_f$: ratio of compression/traction displacement c / force F of suspension
$S_f$: ratio of shear displacement s / force F of suspension

The invention claimed is:

1. An unmanned aerial vehicle (UAV) including a flight propulsion system and a support system coupled to the flight propulsion system, the support system comprising a protective outer cage comprising a plurality of beams connected together configured to surround the flight propulsion system, wherein said beams comprise a structural resistance core providing a principal mechanical resistance of the beam and a stress distribution layer mounted on at least a side of the structural resistance core facing an outer side subject to impact with external objects, said stress distribution layer having a Young's modulus less than 50% of the Young's modulus of the structural resistance core, wherein the stress distribution layer is provided with a thickness h that is in a range of 3% to 30% the thickness or diameter D of the structural resistance core (0.03<h/D<0.3).

2. The UAV according to claim 1, wherein the outer cage comprises a suspension system configured to couple the flight propulsion system, or an inner support structure of the UAV on which the flight propulsion system is mounted, wherein the relative elasticity of the outer cage and the suspension system satisfies the following relationships:

P, <C, <10 P, and P, <S, <10 P, where

P, is a ratio of compression displacement d of the outer cage for a pre-buckling force F, C, is a ratio of compression/traction displacement c of the suspension system for said pre-buckling force F applied between said outer cage and said flight propulsion system or inner support structure, and S, is a ratio of tangential or shear displacement s of the suspension system for said parbuckling force F applied between said outer cage and said flight propulsion system or inner support structure, the magnitude of the pre-buckling force F being selected in a range of 50% to 90% of a magnitude of a force that may be applied to the outer cage before a buckling of one or more beams of said plurality of beams of the outer cage.

3. The UAV according to claim 2, wherein the relative elasticity of the outer cage and the suspension system satisfies the following relationships: 2P, <C, <5P, and 2P, <S, <5P.

4. The UAV according to claim 1, wherein the outer cage comprises a plurality of cage frame modules that are manufactured as separate components and assembled together to form at least a portion of the outer cage configured to surround the flight propulsion system, each cage frame module comprising a plurality of said beams.

5. The UAV according to claim 4, wherein at least some of the cage frame modules form a first polygon shape beam structure, wherein the outer cage comprises a suspension system configured to elastically couple the flight propulsion system, or an inner support structure of the UAV on which the flight propulsion system is mounted, to the outer cage, the suspension system comprising at least two cage frame suspension modules, each cage frame suspension module comprising a polygon shape beam structure identical to said first polygon shape beam structure of said at least some of the cage frame modules to allow the cage frame suspension modules to be assembled with the cage frame modules to form the outer cage.

6. The UAV according to claim 5, wherein the cage frame suspension module comprises frame connection beams forming a polygonal frame connection beam structure connected at the corners of the polygonal frame connection beam structure to radial beams that join together at the other ends of the radial beams, and a suspension element made of a more elastic material than the material of the frame connection and radial beams, the suspension element mounted on an inner side of the cage frame suspension module and comprising radial suspension beams connected to each corner of the polygonal frame connection beam structure and joining together at a bearing support portion configured to be coupled to the propulsion system or inner support structure.

7. The UAV according to claim 4, wherein said plurality of cage frame modules are manufactured as separate components and assembled together to form at least a portion of the outer cage configured to surround the flight propulsion system, said plurality of beams forming each cage frame module comprising beams that form a polygon shape beam structure, wherein each cage frame module further comprises radial beams that interconnect corners of the polygon shape beam structure to a central joining part at another end of the radial beams, the polygon shape beam structure and radial beams forming a single integrally formed part.

8. The UAV according to claim 7, wherein radial suspension beams of the cage frame suspension module, or a portion of radial suspension beams of the cage frame suspension module, comprise a material that has a lower Young's modulus than the material of the beams of the cage frame modules.

9. The UAV according to claim 4, wherein said cage frame modules are coupled together by frame module connectors, wherein the frame module connectors are configured to separate under a bending strain of between 70% and 90% of a bending strain of rupture of one or more of said plurality of beams.

10. The UAV according to claim 9, wherein the frame module connectors are pluggable and configured to unplug under a bending strain of between 70% and 90% of a bending strain of rupture of one or more of said plurality of beams.

11. The UAV according to claim 1 wherein said stress distribution layer has a Young's modulus less than 10% of the Young's modulus of the structural resistance core.

12. The UAV according to claim 1 wherein the thickness or diameter of the structural resistance core said stress distribution layer is provided all around the structural resistance core, or only partially around the structural resistance core facing an outer side of the outer cage.

13. The UAV according to claim 1 wherein, said stress distribution layer is comprises a material selected from a group consisting of Thermoplastic elastomer (TPE), Thermoplastic polyolefin (TPO), polyurethane, toughened epoxy, rubber, expanded polypropylene (EPP), polyimide (PA), polypropylene (PP), silicone polymer, and combinations of these materials.

14. The UAV according to claim 1 wherein an inner support structure of the support system couples the protective outer cage to the flight propulsion system, the inner support structure comprising a gimbal system.

15. The UAV according to claim 1, further comprising a damping mechanism included in a suspension system, the damping mechanism characterized by a damping ratio $zeta=Ds/(2*sqrt(Cf*Mt))$ greater than 0.3, where Ds is the damping in N/(m/s) of the suspension system, Mi is the combined mass of the inner support structure and flight propulsion system, and Cf is a ratio of compression/traction displacement c of the suspension system for a pre-buckling force F applied between said outer cage and inner support structure.

16. The UAV according to claim 15, wherein the damping ratio zeta is in a range $0.4<zeta<0.6$.

17. An unmanned aerial vehicle (UAV) including a flight propulsion system and a support system coupled to the flight propulsion system, the support system comprising a protective outer cage comprising a plurality of beams connected together configured to surround the flight propulsion system, wherein the outer cage comprises a suspension system configured to couple the flight propulsion system, or an inner support structure of the UAV on which the flight propulsion system is mounted, wherein the relative elasticity of the outer cage and the suspension system satisfies the following relationships:

P, <C, <10P, and P, <S, <10P, where

P is a ratio of compression displacement d of the outer cage for a pre-buckling force F,
C, is a ratio of compression/traction displacement c of the suspension system for said pre-buckling force F applied between said outer cage and said flight propulsion system or inner support structure, and
S, is a ratio of tangential or shear displacement s of the suspension system for said pre-buckling force F applied between said outer cage and said flight propulsion system or inner support structure,
the magnitude of the pre-buckling force F being selected in a range of 50% to 90% of a magnitude of a force that may be applied to the outer cage before a buckling of one or more beams of said plurality of beams of the outer cage, wherein the outer cage comprises a plurality of cage frame modules that are manufactured as separate components and assembled together to form at least a portion of the outer cage configured to surround the flight propulsion system, each cage frame module comprising a plurality of said beams wherein at least some of the cage frame modules form a first polygon shape beam structure, and wherein the outer cage comprising the suspension system is configured to elastically couple the flight propulsion system, or an inner support structure of the UAV on which the flight propulsion system is mounted, to the outer cage, the suspension system comprising at least two cage frame suspension modules, each cage frame suspension module comprising a polygon shape beam structure identical to said first polygon shape beam structure of said at least some of the cage frame modules to allow the cage frame suspension modules to be assembled with the cage frame modules to form the outer cage.

18. The UAV according to claim 17, wherein the relative elasticity of the outer cage and the suspension system satisfies the following relationships:

2P, <C, <5 P, and 2P, <S, <5 P.

19. The UAV according to claim 17, wherein said cage frame modules are coupled together by frame module connectors, wherein the frame module connectors are configured to separate under a bending strain of between 70% and 90% of a bending strain of rupture of one or more of said plurality of beams.

20. The UAV according to claim 19, wherein the frame module connectors are pluggable and configured to unplug under a bending strain of between 70% and 90% of a bending strain of rupture of one or more of said plurality of beams.

21. The UAV according to claim 17, wherein radial suspension beams of the cage frame suspension module, or a portion of the radial suspension beams, comprise a material that has a lower Young's modulus than the material of the beams of the cage frame modules.

22. The UAV according to claim 17 wherein an inner support structure of the support system couples the protective outer cage to the flight propulsion system, the inner support structure comprising a gimbal system.

23. An unmanned aerial vehicle (UAV) including a flight propulsion system and a support system coupled to the flight propulsion system, the support system comprising a protective outer cage comprising a plurality of beams connected together configured to surround the flight propulsion system, wherein the outer cage comprises a suspension system configured to couple the flight propulsion system, or an inner support structure of the UAV on which the flight propulsion system is mounted, wherein the relative elasticity of the outer cage and the suspension system satisfies the following relationships:

P, <C, <10P, and P, <S, <10P, where

P is a ratio of compression displacement d of the outer cage for a pre-buckling force F,
C, is a ratio of compression/traction displacement c of the suspension system for said pre-buckling force F applied between said outer cage and said flight propulsion system or inner support structure, and
S, is a ratio of tangential or shear displacement s of the suspension system for said pre-buckling force F applied between said outer cage and said flight propulsion system or inner support structure, the magnitude of the pre-buckling force F being selected in a range of 50% to 90% of a magnitude of a force that may be applied to the outer cage before a buckling of one or more beams of said plurality of beams of the outer cage, wherein the cage frame suspension module comprises frame connection beams forming a polygonal frame connection beam structure connected at the corners of the polygonal frame connection beam structure to radial beams that join together at the other ends of the radial beams, and a suspension element made of a more elastic material than the material of the frame connection and radial beams, the suspension element mounted on an inner side of the cage frame suspension module and comprising radial suspension beams connected to each corner of the polygonal frame connection beam structure and joining together at a bearing support portion configured to be coupled to the propulsion system or inner support structure.

24. An unmanned aerial vehicle (UAV) including a flight propulsion system and a support system coupled to the flight propulsion system, the support system comprising a protective outer cage configured to surround the flight propulsion system, wherein the outer cage comprises a plurality of cage frame modules that are manufactured as separate components and assembled together to form at least a portion of the outer cage configured to surround the flight propulsion system, each cage frame module comprising a plurality of beams at least some of which form a first polygon shape beam structure, wherein the outer cage comprises a suspension system configured to elastically couple the flight propulsion system, or an inner support structure of the UAV on which the flight propulsion system is mounted, to the outer cage, the suspension system comprising at least two cage frame suspension modules, each cage frame suspension module comprising a polygon shape beam structure identical to said first polygon shape beam structure of said at least some of the cage frame modules to allow the cage frame suspension modules to be assembled with the cage frame modules to form the outer cage.

25. The UAV according to claim 24, wherein said plurality of cage frame modules are manufactured as separate components and assembled together to form at least a portion of the outer cage configured to surround the flight propulsion system, said plurality of beams forming each cage frame module comprising beams that form a polygon shape beam structure, wherein each cage frame module further comprises radial beams that interconnect corners of the polygon shape beam structure to a central joining part at another end of the radial beams, the polygon shape beam structure and radial beams forming a single integrally formed part.

26. The UAV according to claim 25, wherein radial suspension beams of the cage frame suspension module, or a portion of the radial suspension beams, comprise a material that has a lower Young's modulus than the material of the beams of the cage frame modules.

27. The UAV according to claim 24, wherein said cage frame modules are coupled together by frame module connectors, wherein the frame module connectors are configured to separate under a bending strain of between 70% and 90% of a bending strain of rupture of one or more of said plurality of beams.

28. The UAV according to claim 27, wherein the frame module connectors are pluggable and configured to unplug under a bending strain of between 70% and 90% of a bending strain of rupture of one or more of said plurality of beams.

29. The UAV according to claim 24, wherein the cage frame suspension module comprises frame connection beams forming a polygonal frame connection beam structure connected at the corners of the polygonal frame connection beam structure to radial beams that join together at the other ends of the radial beams, and a suspension element made of a more elastic material than the material of the frame connection and radial beams, the suspension element mounted on an inner side of the cage frame suspension module and comprising radial suspension beams connected to each corner of the polygonal frame connection beam structure and joining together at a bearing support portion configured to be coupled to the propulsion system or inner support structure.

30. The UAV according to claim 24 wherein an inner support structure of the support system couples the protective outer cage to the flight propulsion system, the inner support structure comprising a gimbal system.

31. An unmanned aerial vehicle (UAV) including a flight propulsion system and a support system coupled to the flight propulsion system, the support system comprising a protective outer cage configured to surround the flight propulsion system, wherein the outer cage comprises a plurality of cage frame modules that are manufactured as separate components and assembled together to form at least a portion of the outer cage configured to surround the flight propulsion system, each cage frame module comprising a plurality of beams, wherein at least some of the plurality of beams that form a polygon shape beam structure, wherein each cage frame module further comprises radial beams that interconnect corners of the polygon shape beam structure to a central joining part at another end of the radial beams, the polygon shape beam structure and radial beams forming a single integral part, wherein said cage frame modules are coupled together by frame module connectors, wherein the frame module connectors are configured to separate under a bending strain of between 70% and 90% of a bending strain of rupture of one or more of said plurality of beams.

32. The UAV according to claim 31, wherein the frame module connectors are pluggable and configured to unplug under a bending strain of between 70% and 90% of a bending strain of rupture of one or more of said plurality of beams.

33. An unmanned aerial vehicle (UAV) including a flight propulsion system and a support system coupled to the flight propulsion system, the support system comprising a protective outer cage configured to surround the flight propulsion system, the outer cage comprising a plurality of cage frame modules that are manufactured as separate components and assembled together to form the outer cage configured to surround the flight propulsion system, each cage frame module comprising a plurality of beams, said cage frame modules coupled together by frame module connectors, wherein the frame module connectors are configured to separate under a bending strain of between 70% and 90% of a bending strain of rupture of one or more of said plurality of beams.

34. The UAV according to claim 33, wherein the frame module connectors are pluggable and configured to unplug under a bending strain of between 70% and 90% of a bending strain of rupture of one or more of said plurality of beams.

* * * * *